United States Patent
Cutler et al.

(10) Patent No.: US 11,611,714 B2
(45) Date of Patent: Mar. 21, 2023

(54) GENERATING CUSTOMIZED, PERSONALIZED REACTIONS TO SOCIAL MEDIA CONTENT

(71) Applicant: Meta Platforms, Inc., Menlo Park, CA (US)

(72) Inventors: Blake Cutler, Santa Monica, CA (US); Mihika Kapoor, Scarsdale, NY (US); Andew James Taylor, Kingsville (AU); Andrea Mittelstaedt, San Francisco, CA (US); Peter Jongin Lee, North Hills, CA (US); Yo-Tzu Yeh, San Francisco, CA (US); Duylinh Nguyen, San Francisco, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 383 days.

(21) Appl. No.: 16/810,349

(22) Filed: Mar. 5, 2020

(65) Prior Publication Data

US 2021/0037195 A1    Feb. 4, 2021

Related U.S. Application Data

(60) Provisional application No. 62/881,826, filed on Aug. 1, 2019.

(51) Int. Cl.
 *H04N 5/272* (2006.01)
 *H04N 5/232* (2006.01)
 (Continued)

(52) U.S. Cl.
 CPC .............. *H04N 5/272* (2013.01); *G06T 11/60* (2013.01); *H04L 51/52* (2022.05);
 (Continued)

(58) Field of Classification Search
 CPC .............. H04N 5/272; H04N 5/232935; G06F 16/9532; G06T 11/60; G06Q 30/0271;
 (Continued)

(56) References Cited

U.S. PATENT DOCUMENTS 10,872,475 B2 * 12/2020 Aluru ...................... G06T 19/20
11,237,620 B2 *  2/2022 Liechtenstein ......... G06F 3/013
(Continued)

OTHER PUBLICATIONS

Garrido, Pablo & Valgaert, Levi & Wu, Chenglei & Theobalt, Christian. (2013). Reconstructing Detailed Dynamic Face Geometry from Monocular Video. ACM Transactions on Graphics. 32. 1-10.

*Primary Examiner* — Marly S Camargo
(74) *Attorney, Agent, or Firm* — Keller Preece PLLC

(57) ABSTRACT

The present disclosure is directed toward systems, computer-readable media, and methods for generating a personalized selfie reaction-element in connection social media content. For example, the systems and methods described herein generate a personalized selfie reaction-element including a multi-media item and one or more elements and/or enhancements. The systems and method described herein can then provide the personalized selfie reaction-element for use in connection with various types of social media content including communication threads, ephemeral content, posts, and direct messages.

20 Claims, 18 Drawing Sheets

(51) Int. Cl.
*G06F 16/953* (2019.01)
*G06T 11/60* (2006.01)
*G06Q 30/02* (2012.01)
*H04L 51/10* (2022.01)
*H04L 51/52* (2022.01)
*H04N 1/00* (2006.01)

(52) U.S. Cl.
CPC ..... *H04N 1/00159* (2013.01); *H04N 5/23219* (2013.01); *H04N 5/232935* (2018.08)

(58) Field of Classification Search
CPC .... G06Q 30/0277; G06Q 50/01; H04L 51/10; H04L 51/32; H04L 51/52
See application file for complete search history.

(56) References Cited

U.S. PATENT DOCUMENTS

| | | | |
|---|---|---|---|
| 2010/0121915 A1* | 5/2010 | Wang | G06F 15/26 703/203 |
| 2012/0307075 A1* | 12/2012 | Margalit | G06T 1/0007 348/180 |
| 2018/0108172 A1* | 4/2018 | Huston | G06T 15/20 |
| 2018/0302568 A1* | 10/2018 | Kim | H04N 5/23293 |
| 2019/0342507 A1* | 11/2019 | Dye | H04N 5/272 |
| 2020/0051303 A1* | 2/2020 | Li | G06T 13/40 |
| 2020/0264738 A1* | 8/2020 | Lee | G06T 3/048 |
| 2020/0312002 A1* | 10/2020 | Comploi | G06T 13/10 |
| 2022/0215608 A1* | 7/2022 | Comploi | G06T 7/50 |
| 2022/0319075 A1* | 10/2022 | Hu | G06T 1/60 |
| 2022/0358344 A1* | 11/2022 | Tomasov | G06Q 50/01 |

* cited by examiner

GENERATING CUSTOMIZED, PERSONALIZED REACTIONS TO SOCIAL MEDIA CONTENT

CROSS REFERENCE TO RELATED APPLICATIONS

This application claims the benefit of and priority to U.S. Provisional Patent Application No. 62/881,826, filed Aug. 1, 2019, the contents of which are hereby incorporated by reference in their entirety.

BACKGROUND

Recent years have seen significant improvements in digital communication. For example, conventional social media systems can enable users to generate, post, and interact with social media content. To illustrate, conventional social media systems can enable a user to access GIFs, stickers, and other digital elements in order to react to a co-user's post or direct message.

Although conventional social media systems can enable users to generate, post, and interact with various types of social media content, such systems have a number of problems in relation to flexibility and accuracy. To illustrate, conventional social media systems can utilize pre-generated reaction elements (e.g., GIFs, stickers, emoticons) in social media communications to convey a reaction or response. Such pre-generated reaction elements, however, provide little flexibility. In particular, beyond changing colors, conventional pre-generated reaction elements are typically fixed and provide no opportunity to provide a personalized reaction.

In addition to being inflexible, conventional pre-generated reaction elements are often inaccurate. In particular, users are typically forced to choose one of a set of pre-generated reaction elements. In some cases, however, there may not be a pre-generated reaction element that accurately or fully captures how a given user wishes to re-act to social media content. Due to convenience and/or time constraints, the given users may opt to use the pre-generated reaction element that is inaccurate.

These along with additional problems and issues exist with regard to conventional social media systems.

BRIEF SUMMARY

Embodiments of the present disclosure provide benefits and/or solve one or more of the foregoing or other problems in the art with systems, non-transitory computer-readable media, and methods for generating, within a social media application, customized selfie reaction-element s in connection with social media content. For example, in one or more embodiments, the systems, non-transitory computer-readable media, and methods described herein enable a user to configure and generate a personalized selfie reaction-element within a social media application during an ongoing chat thread and/or actively playing ephemeral content. The systems, computer-readable media, and methods described herein can also utilize facial detection and tracking techniques in applying selected augmented reality elements to the captured multi-media recording of a user in order to generate a customized, personalized selfie reaction-element. The systems, computer-readable media, and methods described herein can then provide the generated personalized selfie reaction-element for inclusion in a communication thread, to be incorporated into ephemeral content, or for other use in social media communications.

Additional features and advantages of the present application will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features can be obtained, a more particular description of the aspects of one or more embodiments briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of scope, one or more embodiments will be described and explained with additional specificity and detail through the use of the accompanying drawings in which.

DETAILED DESCRIPTION

Figure 1:
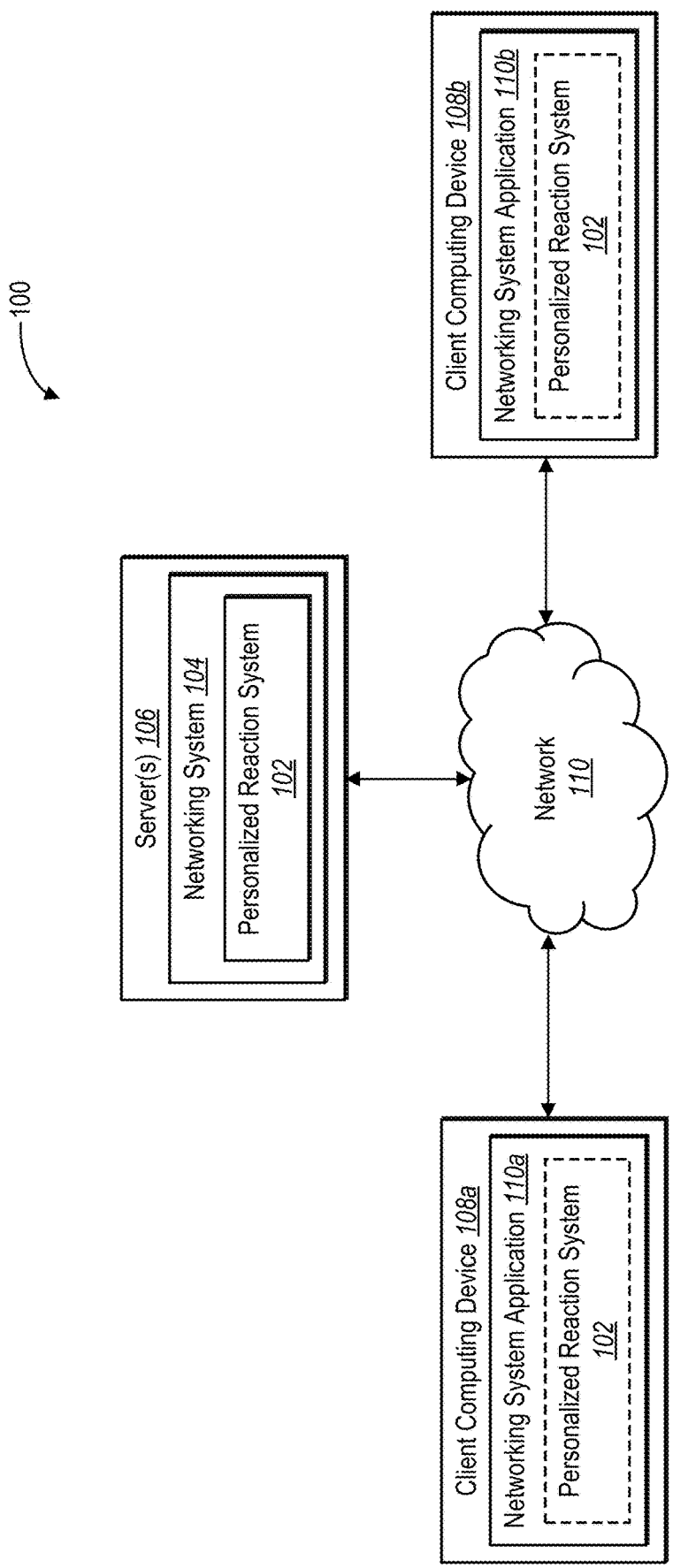
FIG. 1 illustrates an environmental diagram of a personalized reaction system in accordance with one or more embodiments.

One or more embodiments of the present disclosure includes a personalized reaction system that generates a personalized selfie reaction-element for association with social media content in response to user input received via a social media application. For example, the personalized reaction system can provide various tools and options for configuring and generating customized, personalized selfie reaction-elements within a social media application that enable a user to quickly and easily add customized, personalized selfie reaction-element s to social media content. In one or more embodiments, the personalized reaction system determines and provides augmented reality ("AR") elements that may be associated with or incorporated into a customized, personalized selfie reaction-element.

To illustrate, in one or more embodiments, a user may be accessing a social media application to engage in various types of social media communication with various co-users (e.g., "friends"). For example, the user may be participating in a chat thread, composing a post, viewing a co-user's ephemeral content, or creating his or her own ephemeral content. Often, users will react to electronic communications, posts, and ephemeral content with rich communication objects such as GIFs, stickers, and emoticons in order to quickly communicate a thought or sentiment. Despite this, as discussed above, conventional social media systems generally do not provide flexibility. As such, the user misses out on the opportunity to react to a social media communication in a genuine way utilizing rich communication objects.

To remedy this, the personalized reaction system provides a "selfie" option in connection with various types of social media communications (e.g., chat threads and ephemeral content) within a social media application. In one or more embodiments, and in response to a detected selection of the selfie option, the personalized reaction system accesses a camera of the user's client-computing device in order to provide a live camera viewfinder display in connection with various options for configuring a customized, personalized selfie reaction-element. In at least one embodiment, the personalized reaction system provides the live camera viewfinder display and configuration options in a single graphical user interface overlaid on the currently active social media communication. In one or more embodiments, the personalized reaction system can capture a multi-media still or recording via the live camera viewfinder in response to detecting user input (e.g., a long press on a shutter button).

Moreover, in one or more embodiments, the personalized reaction system can provide one or more AR enhancements. For example, the personalized reaction system can determine a number of AR enhancements based on overall popularity, the user's social media use history, the user's social media profile information, or information associated with one or more of the user's social media co-users. The personalized reaction system can then provide the AR enhancements as options for customizing a reaction element.

The personalized reaction system can then combine the captured selfie with one or more selected AR enhancements to generate a customized personalized reaction selfie. The customized personalized reaction selfie provides a personalized reaction by including a selfie of the user. Furthermore, the customized personalized reaction selfie provides various options for the user to customize or tailor the reaction selfie to provide a desired reaction, sentiment, or feeling via the AR enhancements.

Furthermore, the personalized reaction system can provide various additional options to stylize a customized personalized reaction selfie. For example, the personalized reaction system can utilize facial detection techniques to crop out a background of a captured multi-media recording of a user. Additionally, the personalized reaction system can add in additional background, such as a gradient color background.

In one or more embodiments, the personalized reaction system can associate a generated customized personalized reaction selfie with social media content. For example, in one embodiment, the personalized reaction system can associate a generated customized personalized reaction selfie with social media content such as a chat thread electronic communication, a social media post, and/or ephemeral content associated with the user or one or more of the user's co-users.

Accordingly, the personalized reaction system provides a number of advantages and benefits over conventional social media systems and methods. For example, by providing tools and functionality within a single social media application that enables a user to configure a customized personalized reaction selfie, the personalized reaction system improves efficiency relative to conventional social media systems. Specifically, the personalized reaction system efficiently utilizes computing resources by providing customized personalized reaction selfie functionality within a single social media application without requiring another application to create the personalized content.

Moreover, the personalized reaction system improves accuracy relative to conventional social media systems. For example, the personalized reaction system allows users to generate a personalized reaction selfie that accurately portrays a reaction, sentiment, or feeling the user desires to convey in response to social media content.

Additionally, the personalized reaction system improves flexibility relative to conventional social media systems. For example, in one or more embodiments, the personalized reaction system flexibility provides the ability to create personalized reactions selfies on the fly in response to social media content rather than using pre-generated reaction elements.

As illustrated by the foregoing discussion, the present disclosure utilizes a variety of terms to describe features and advantages of the personalized reaction system. For example, as used herein "social media content" refers to any type of content available via a networking system. In one or more embodiments, social media content can include, but is not limited to, electronic communications, posts, images, recordings, media players, commercial content, ephemeral content, and interactive display elements.

As used herein, "ephemeral content" refers to social media content that is available for viewing during a predetermined window of time. For example, ephemeral content can include edited or unedited images and recordings within a user's ephemeral content collection available via the networking system. In at least one embodiment, the networking system retains newly added ephemeral content within the user's ephemeral content collection for a predetermined amount of time (e.g., 24 hours) starting from when the ephemeral content was added. At the end of the predetermined amount of time, the networking system can automatically remove and delete the ephemeral content from the user's ephemeral content collection.

As used herein, a "multi-media item" refers to multi-media images and multi-media recordings for use in configuring and generating a customized, personalized selfie reaction-element. For example, a multi-media recording can be a recording captured via a camera of a client-computing device (e.g., a front-facing camera of a smart phone). Similarly, a multi-media image can be a still image captured via a camera of a client-computing device.

As used herein, a "personalized selfie reaction-element" refers to a display element that includes a selfie multi-media item. For example, a personalized selfie reaction-element can include a multi-media recording or image of a user. A "customized, personalized selfie reaction-element" can comprise a selfie multi-media item with one or more augmented reality (AR) enhancements. For example, a customized, personalized selfie reaction-element can comprise a multi-media recording or image of a user laughing with an overlay of augmented reality tears.

As used herein, an "augmented reality enhancement" or "AR enhancement" refers to a computer-generated display element that is incorporated into a multi-media item. For example, the personalized reaction system can incorporate an overlay-type augmented reality enhancement into a multi-media recording such that the augmented reality enhancement tracks a certain portion or area of a user's face throughout the multi-media recording. Additionally, the personalized reaction system can incorporate an alteration-type augmented reality enhancement into a multi-media recording such that an area or portion of the user's face is altered throughout the multi-media recording.

FIG. 1 illustrates an example environment 100 for implementing the personalized reaction system 102. As illustrated in FIG. 1, the environment 100 includes client-computing devices 102a, 102b that implement networking system applications 110a, 110b. Further shown in FIG. 1, the environment 100 also includes a server 106 hosting a networking system 104 that includes the personalized reaction system 102. The networking system 104 can comprise a system that connects client-computing device users and allows exchange of data over a network. Also as illustrated in FIG. 1, in one or more embodiments, the networking system 104 operates the personalized reaction system 102. In additional or alternative embodiments, the networking system application 110a, 110b includes part or all of the personalized reaction system 102 installed on the client-computing devices 108a, 108b, respectively.

The client-computing devices 108a, 108b and the server 106 communicate via a network 112, which may include one or more networks and may use one or more communication platforms or technologies suitable for transmitting data and/or communication signals. In one or more embodiments, the network 112 includes the Internet or World Wide Web. The network 112, however, can include various other types of networks that use various communication technologies and protocols, such as a corporate intranet, a virtual private network ("VPN"), a local area network ("LAN"), a wireless local network ("WLAN"), a cellular network, a wide area network ("WAN"), a metropolitan area network ("MAN"), or a combination of two or more such networks.

Although FIG. 1 illustrates a particular number and arrangement of client-computing devices, in additional embodiments the client-computing devices 108a, 108b may directly communicate with the networking system 104, bypassing the network 112. Further, in other embodiments, the environment 100 may include any number of client-computing devices. Additional details with respect to the client-computing devices 108a, 108b are discussed below with respect to FIG. 8.

In one or more embodiments, the client-computing devices 108a, 108b can be one of various types of computing devices. For example, each of the client-computing devices 108a, 108b may include a mobile device such as a mobile telephone, a smartphone, a PDA, a tablet, or a laptop. Additionally, or alternatively, the client-computing devices 108a, 108b may include a non-mobile device such as a desktop computer, a server, or another type of computing device. It will be understood that a both client-computing devices 108a, 108b can include the same type of computing functionality. In other words, in a preferred embodiment, both the client-computing device 108a and the client-computing device 108b are mobile computing devices, such as smartphones. In at least one embodiment, the user of the client-computing device 108a and the user of the client-computing device 108b are associated or co-users (e.g., "friends") via the networking system 104.

In one or more embodiments, each of the client-computing devices 108a, 108b include a networking system application 110a, 110b associated with the networking system 104. For example, the networking system application 110a, 110b enables the users of the client-computing devices 108a, 108b to view and interact with networking system content, and to submit social media content via the networking system 104. In at least one embodiment, social media content submitted to the networking system 104 from the client-computing device 108a can be viewed and interacted with at the client-computing device 108b, and vice versa. Furthermore, in at least one embodiment, as mentioned above, the networking system application 110a, 110b includes part or all of the personalized reaction system 102.

As shown in FIG. 1, and as mentioned above, the server 106 hosts the networking system 104. In one or more embodiments, the networking system 104 provides posts, electronic messages, ephemeral content, structured objects, and live video streams to one or more co-users (e.g., by way of a profile, a newsfeed, a communication thread, a timeline, a "wall," a live video stream display, or any other type of graphical user interface presented via the networking system application 110a, 110b on the client-computing devices 102a, 102b respectively). For example, one or more embodiments provide a user with a communication thread including one or more electronic messages exchanged between the users of the client-computing device 108a, and the client-computing device 108b. In another example, one or more embodiments provide a user with a social networking system newsfeed containing posts from one or more co-users associated with the user (e.g., the user's "friends"). In one or more embodiments, a post and/or electronic message can include one or more media communications (e.g., edited or unedited digital photographs and digital videos), such as described above.

The networking system 104 also enables the user to engage in all other types of networking system activity. For example, the networking system 104 enables a social networking system user to interact with communication threads, watch and/or create ephemeral content, click on posts and hyperlinks, compose and submit electronic messages and posts, interact with structured object, watch live video streams, interact with media communications, and so forth.

As will be described in more detail below, the components of the personalized reaction system 102 can provide, along and/or in combination with other components, one or more graphical user interfaces ("GUIs"). In particular, the networking system applications 110a, 110b on the client-computing devices 108a, 108b can display one or more GUIs generated by the personalized reaction system 102, described above. The networking system applications 110a, 110b enable the user of the client-computing device 108a and/or the user of the client-computing device 108b to interact with a collection of display elements within one or more GUIs for a variety of purposes. FIGS. 2A-4F and the description that follows illustrate various example embodiments of the GUIs that are used to describe the various features of the personalized reaction system 102.

For example, FIGS. 2A-2F illustrate features of the personalized reaction system 102 in connection with a communication thread hosted by the networking system 104 between the user of the client-computing device 108a and the client-computing device 108b. FIGS. 3A-3E illustrate features of the personalized reaction system 102 in connection with ephemeral content created on the client-computing device 108a utilizing the networking system application 110a. FIGS. 4A-4F illustrate features of the personalized reaction system 102 in connection with ephemeral content created on the client-computing device 108b and accessed on the client-computing device 108a.

Figure 2B:
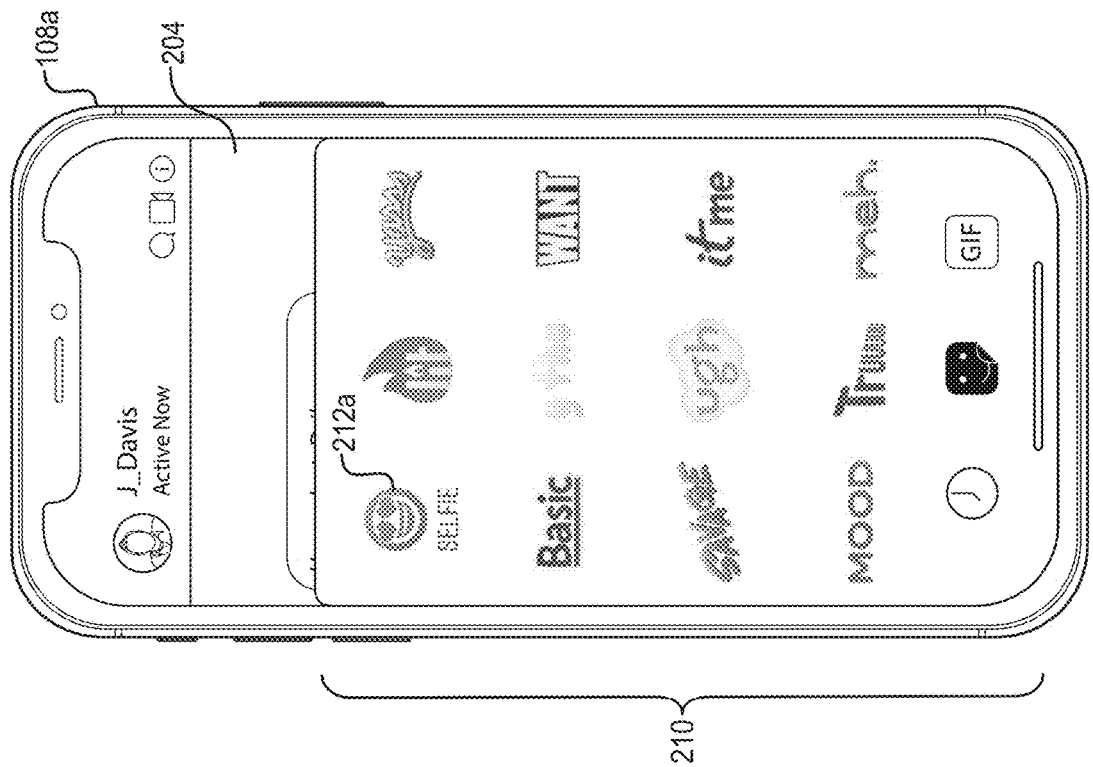
FIGS. 2A-2F illustrate a series of graphical user interfaces that the personalized reaction system can provide in configuring and generating a personalized selfie reaction-element for use in connection with a communication thread in accordance with one or more embodiments.
Figure 2A:
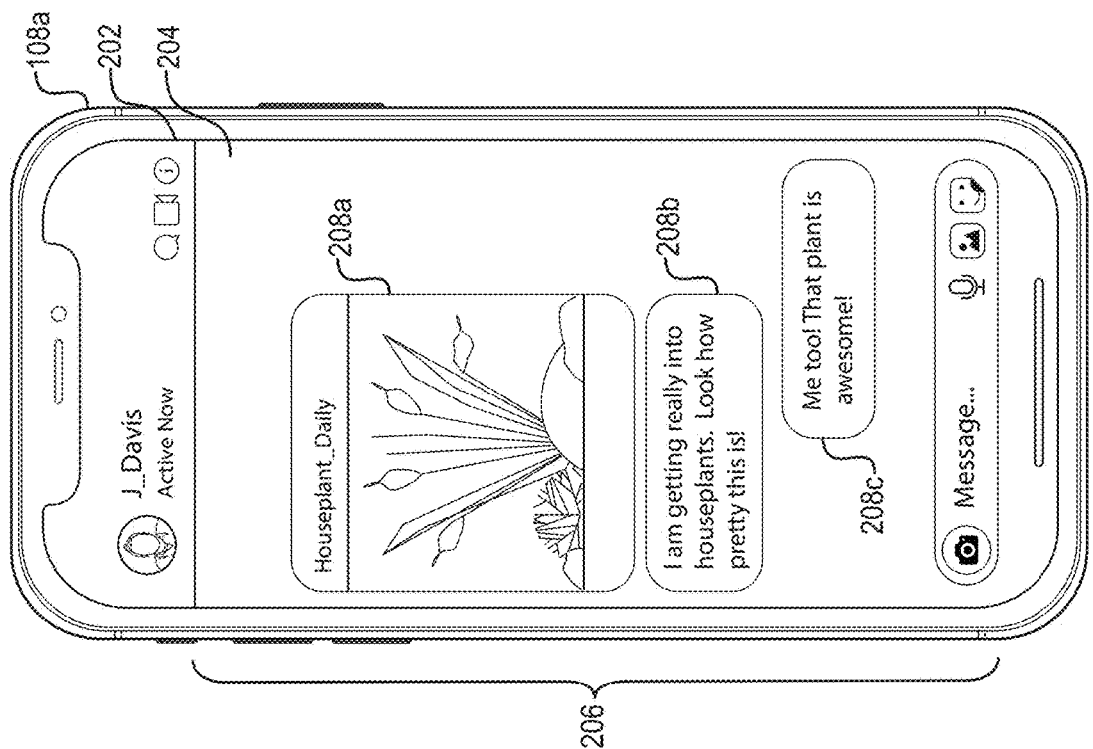

As just mentioned, the personalized reaction system 102 provides features and functionality to a user in response to the user initializing the networking system application 110a on the client-computing device 108a. FIG. 2A illustrates the personalized reaction system 102 providing a communication thread GUI 204 on a touch screen display 202 on the client-computing device 108a. In one or more embodiments, the networking system application 110a (as described with reference to FIG. 1) organizes one or more electronic communications 208a, 208b, and 208c within a communication thread 206 displayed within the communication thread GUI 204. For example, the networking system application 110a organizes the electronic communications 208a-208c chronologically in the communication thread 206 in the order they were received and displays each electronic communication 208a, 208b, and 208c so as to indicate the sender of each communication. In at least one embodiment, the communication thread 206 includes the electronic communications 208a-208c exchanged between the user of the client-computing device 108a (e.g., the electronic communication 208c) and the user of the client-computing device 102b (e.g., the electronic communications 208a, 208b).

In one or more embodiments, the networking system 104 can provide various options for creating electronic communications (e.g., social media content) for inclusion in the communication thread 206. For example, in response to a detected user input via the communication thread GUI 204 (e.g., a swipe up, a selection of an option element adjacent to a text input box, etc.), the networking system 104 can provide an options overlay 210, as shown in FIG. 2B, overlaid on all or a portion of the communication thread GUI 204. As shown in FIG. 2B, the options overlay 210 can include the selectable selfie option 212a, along with other electronic communications selectable options (e.g., stickers, GIFS, emoji).

In response to a detected selection of the selfie option 212a, the personalized reaction system 102 can provide configuration options for the creation of a customized, personalized selfie reaction-element. For example, as shown in FIG. 2C, the personalized reaction system 102 can provide the selfie configuration overlay 214 on the communication thread GUI 204. In one or more embodiments, the selfie configuration overlay 214 can include a configuration portion and a saved stickers portion.

In at least one embodiment, as shown in FIG. 2C, the configuration portion includes: a live camera viewfinder display 218; augmented reality enhancement options 220a, 220b, 220c, and 220d; a background selection element 222, a timer element 224, and a capture element 226. Each of these will now be discussed in detail. For example, the live camera viewfinder display 218 includes a viewfinder feed from a camera of the client-computing device 108a. In one or more embodiments, the viewfinder feed may be from a front-facing camera of the client-computing device 108a or a rear-facing camera of the client-computing device 108a.

As discussed above, in one or more embodiments, the personalized reaction system 102 generates a personalized selfie reaction-element based on an underlying multi-media item and one or more additional effects and/or enhancements. In at least one embodiment, the personalized reaction system 102 can capture a multi-media item in response to a detected selection of the capture element 226. For example, the personalized reaction system 102 can capture a multi-media recording of the viewfinder feed within the live camera viewfinder display 218 in response to a detected press-and-hold touch gesture with the capture element 226. In one or more embodiments, the multi-media recording comprises a video. In alternative embodiments, the multi-media recording comprises super short, a burst of images stitched together into a video that plays forward and backward repeatedly. Additionally, the personalized reaction system 102 can capture a multi-media image (e.g., a snapshot or frame) from the viewfinder feed within the live camera viewfinder display 218 in response to a detected tap touch gesture with the capture element 226. In at least one embodiment, the personalized reaction system 102 can toggle back and forth between a color view and black-and-white view of the multi-media item in response to a detected selection of the display 218.

After capturing a multi-media item, the personalized reaction system 102 can replace the viewfinder feed in the live camera viewfinder display 218 with the captured multi-media item. In this configuration, the personalized reaction system 102 can provide a real-time display of the personalized selfie reaction-element as the user selects configuration options.

In one or more embodiments, the personalized reaction system 102 provides the augmented reality enhancement options 220a-220d for overlay or incorporation into a customized, personalized selfie reaction-element. For example, in response to a detected selection of the augmented reality enhancement option 220a, the personalized reaction system 102 adds no augmented reality enhancements to the selfie element within the display 218. In response to a detected selection of the augmented reality enhancement option 220b, the personalized reaction system 102 can add a "crying" augmented reality enhancement to the selfie element within the display 218 (e.g., AR tears). In response to a detected selection of the augmented reality enhancement option 220c, the personalized reaction system 102 can add AR "heart eyes" to the selfie element within the display 218. In response to a detected selection of the augmented reality enhancement option 220d, the personalized reaction system 102 can add an AR "celebration" augmented reality enhancement to the selfie element within the display 218.

In one or more embodiments, the personalized reaction system 102 can add additional effects to the selfie element within the display 218. For example, in response to a detected selection of the background selection element 222, the personalized reaction system 102 can add a solid or gradient colored background to the selfie elements within the display 218. To illustrate, in response to a detected selection of the background selection element 222, the personalized reaction system 102 can utilize facial/body detection techniques to identify a person (e.g., the user of the client-computing device 108a) within the display 218. Based on this identification, the personalized reaction system 102 can further segment out a background (e.g., the space surrounding the identified person) within the display 218 and replace the cropped background with a solid or gradient color. In at least one embodiment, the personalized reaction system 102 can provide an additional display of color and background options for selection in response to repeated selection of the background selection element 222.

In one or more embodiments, the personalized reaction system 102 can enable the user to set a timer in association with the capture element 226. For example, in response to a detected selection of the timer element 224, the personalized reaction system 102 can capture a multi-media item after a predetermined amount of time (e.g., 3 seconds). The delay can allow the user to have both hands free to be in the capture multi-media item or otherwise pose for the capture of the multi-media item. Additionally, in at least one embodiment, in response to a detected selection of the timer element 224, the personalized reaction system 102 can provide further options with regard to the predetermined amount of time and the type of multi-media item captured (e.g., a multi-media recording or a multi-media image).

Figure 2D:
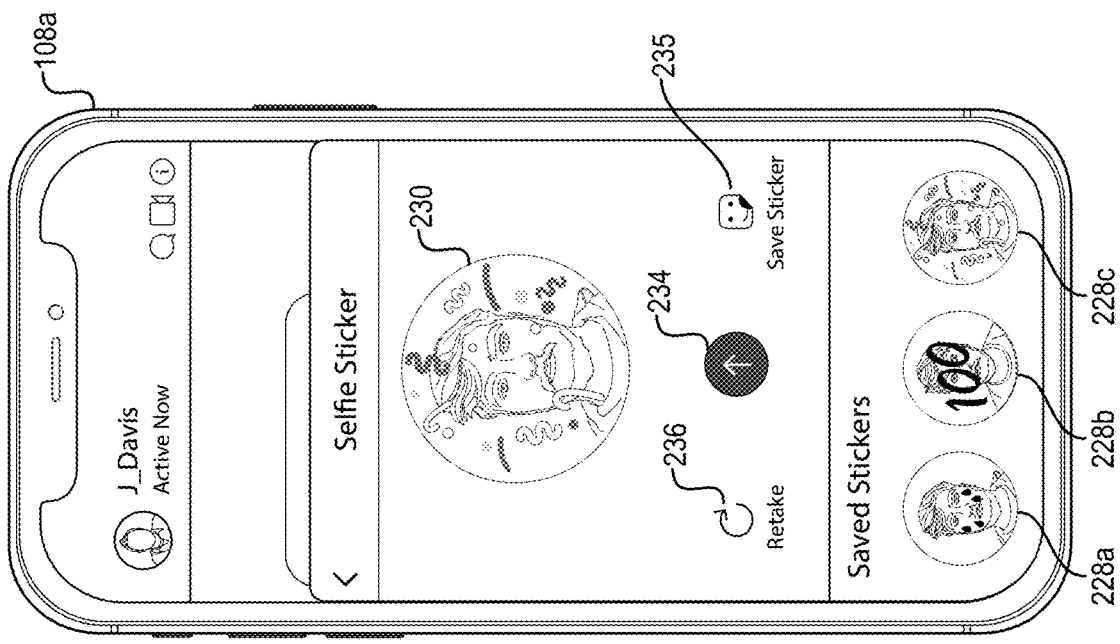
Figure 2C:
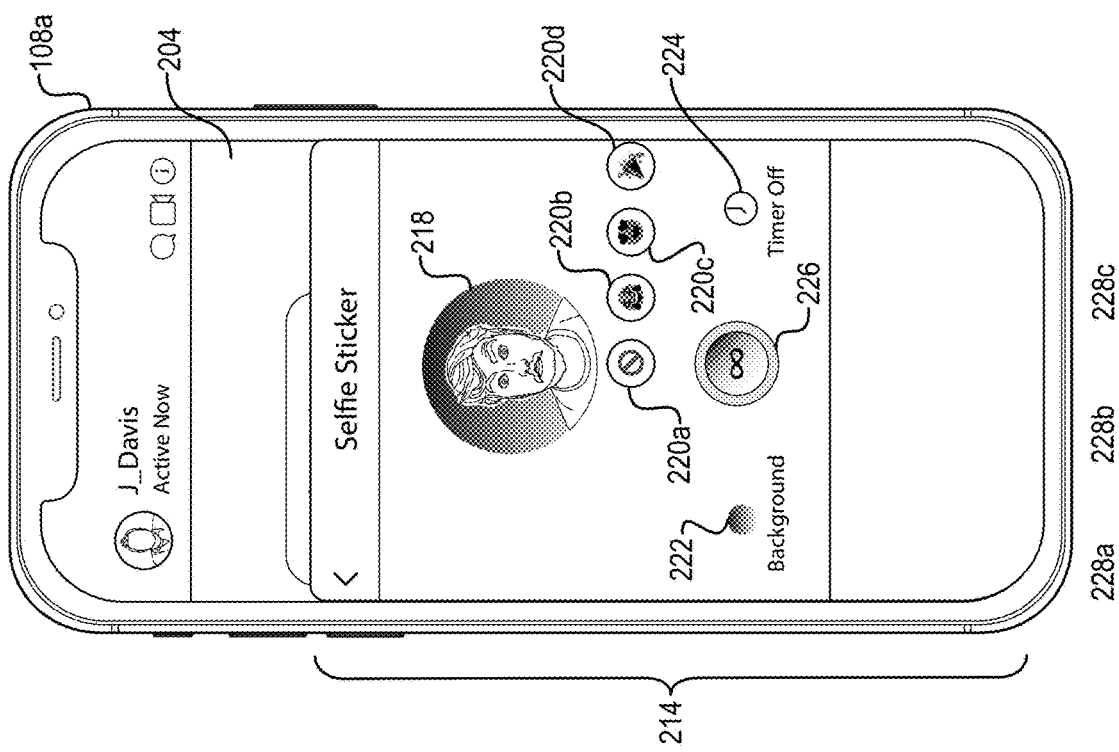

As shown by FIG. 2D, once the user has captured a multi-media item (and optionally one or more AR enhancements), the personalized reaction system 102 can replace the live camera viewfinder display 218 with the selfie preview 230. As further shown in FIG. 2D, the personalized reaction system 102 can enable further configuration of a customized, personalized selfie reaction-element. For example, in response to a detected selection of the retake element 236, the personalized selfie reaction-element can display the capture and configuration elements (e.g., as shown in FIG. 2C) to reconfigure any component of the customized, personalized selfie reaction-element. After any additional reconfiguration of the customized, personalized selfie reaction-element, the personalized reaction system 102 can send the personalized selfie reaction-element to the networking system 104 in response to a detected selection of the send element 232.

Figure 2F:
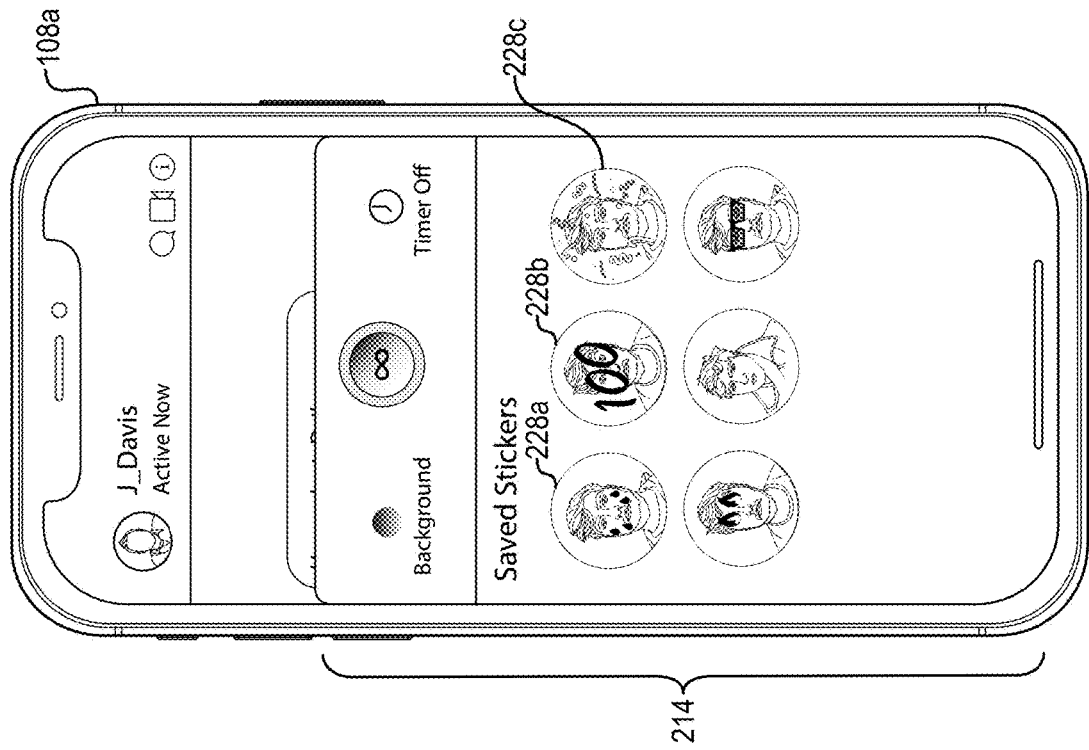
Figure 2E:
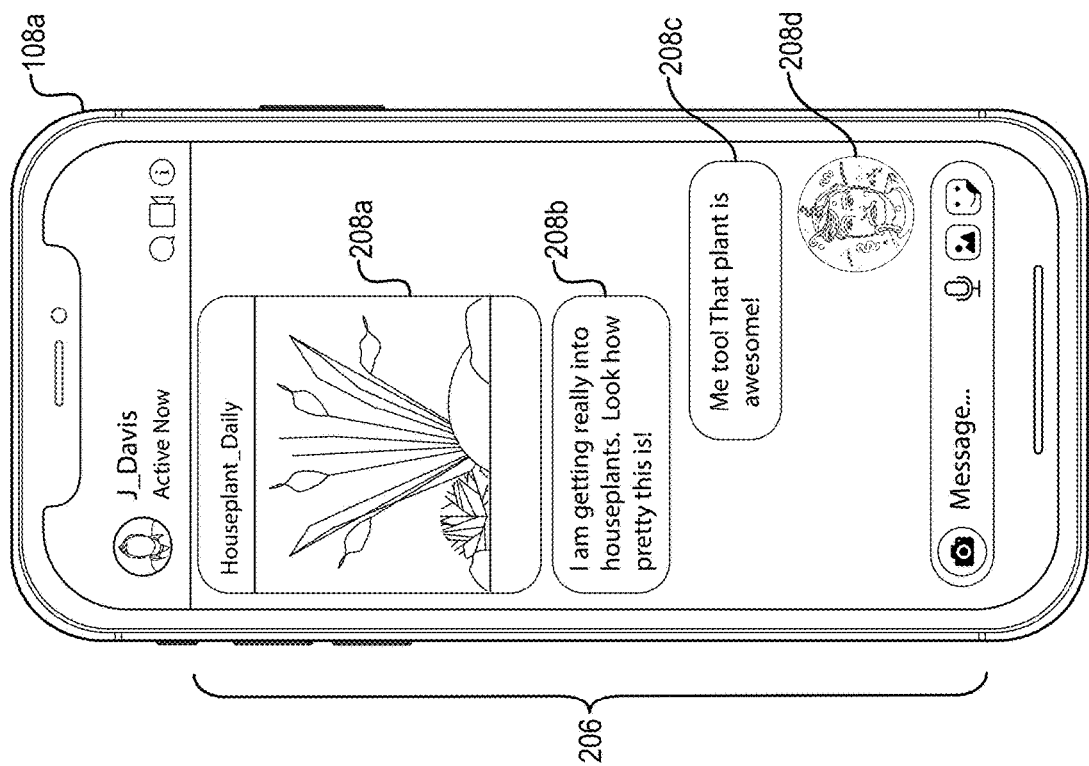

For example, as shown in FIG. 2F, the personalized reaction system 102 can add the personalized selfie reaction-element to the communication thread 206. In particular, in response to a detected selection of the send element 232 (e.g., as in FIG. 2D), the personalized reaction system 102 can generate an electronic communication 208d including the personalized selfie reaction-element. The personalized reaction system 102 can further add the generated electronic communication 208d to the communication thread 206 including electronic communications 208a-208c between the user of the client-computing device 108a and the user of the client-computing device 108b. If the personalized selfie reaction-element includes any augmented reality enhancements or other effects (e.g., auto-looping multi-media recording, black-and-white coloring, gradient color background, etc.), the personalized reaction system 102 can generate the electronic communication 208d to further reflect those enhancements and effects.

Returning to FIG. 2D, after generating the personalized selfie reaction-element, the personalized reaction system 102 can provide an option to save the personalized selfie reaction-element. In particular, the personalized reaction system 102 can provide a save sticker option 235. As shown in FIG. 2D, the selfie configuration overlay 214 can include a saved sticker portion. Upon selection of the save sticker option 235, the personalized reaction system 102 can add the personalized selfie reaction-element to the saved sticker portion. In one or more embodiments, the personalized reaction system 102 provides one or more previously generated customized, personalized selfie reaction-elements 228a, 228b, 228c within the saved sticker portion of the selfie configuration overlay 214. In response to a detected user interaction with the selfie configuration overlay 214 (e.g., a swipe-up touch gesture), the personalized reaction system 102 can scroll the selfie configuration overlay 214 so as to display additional previously generated customized, personalized selfie reaction-elements within the selfie configuration overlay 214. For example, as shown in FIG. 2F, in response to a detected user interaction with the selfie configuration overlay 214, the personalized reaction system 102 can remove display elements in the configuration portion of the selfie configuration overlay 214 while adding an additional row of previously generated customized, personalized selfie reaction-elements.

As shown in FIGS. 2A-2F, the personalized reaction system 102 can provide personalized selfie reaction-element customization functionality in connection with electronic communications within a communication thread. In additional embodiments, the personalized reaction system 102 can provide this functionality in connection with other types of social media content. For example, as shown in FIGS. 3A-3E, the personalized reaction system 102 can provide this functionality in connection with ephemeral social media content. As discussed above, the networking system 104 enables and provides ephemeral content including multi-media recordings and multi-media images for a predetermined amount of time (e.g., 24 hours) as part of a user's ephemeral content collection (e.g., the user's "story").

Figure 3B:
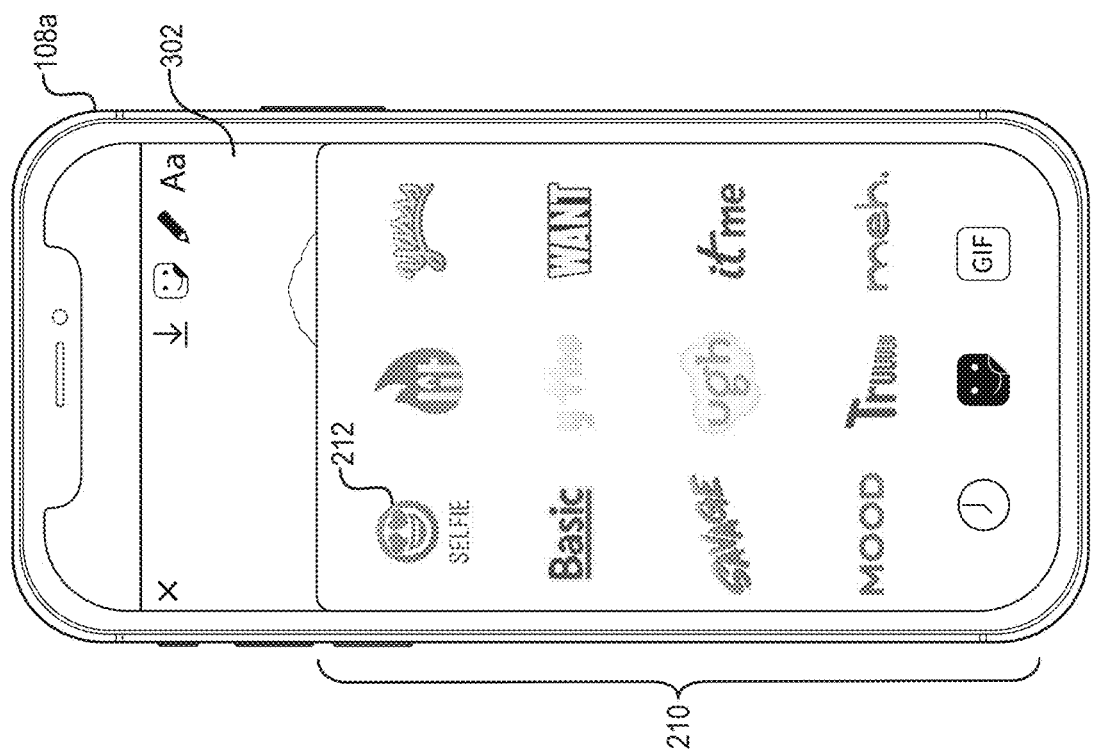
FIGS. 3A-3E illustrate a series of graphical user interfaces that the personalized reaction system can provide in configuring and generating a personalized selfie reaction-element for use in connection with a user's ephemeral content in accordance with one or more embodiments.
Figure 3A:
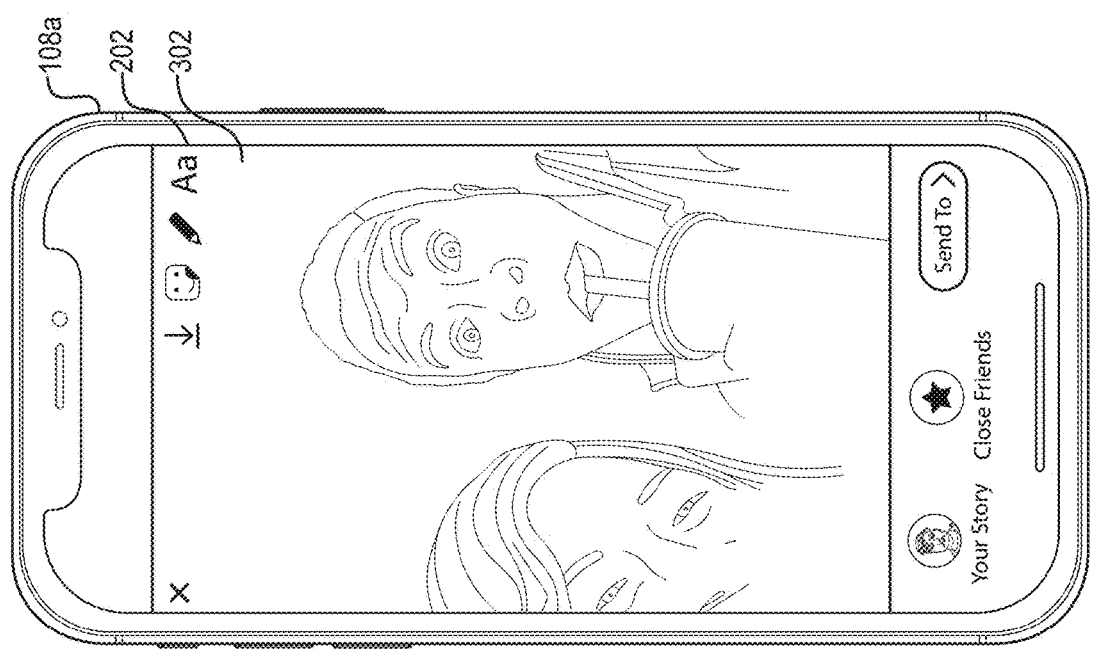

FIG. 3A illustrates an ephemeral content display 302 on the touch screen display 202 of the client-computing device 108a. For example, within the ephemeral content display 302, the networking system 104 can provide the ephemeral content within the ephemeral content collection of the user of the client-computing device 108a. In one or more embodiments, the personalized reaction system 102 can enable further configuration of the ephemeral content by providing the options overlay 210, as shown in FIG. 3B, and as discussed above with reference to FIG. 2B.

Figure 3D:
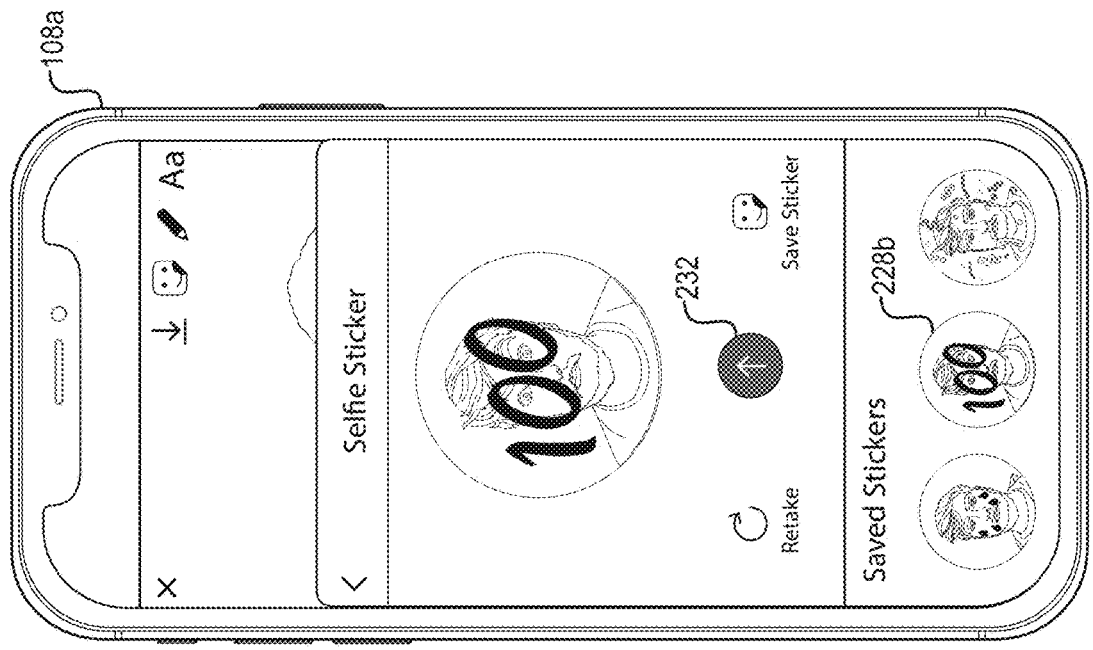
Figure 3C:
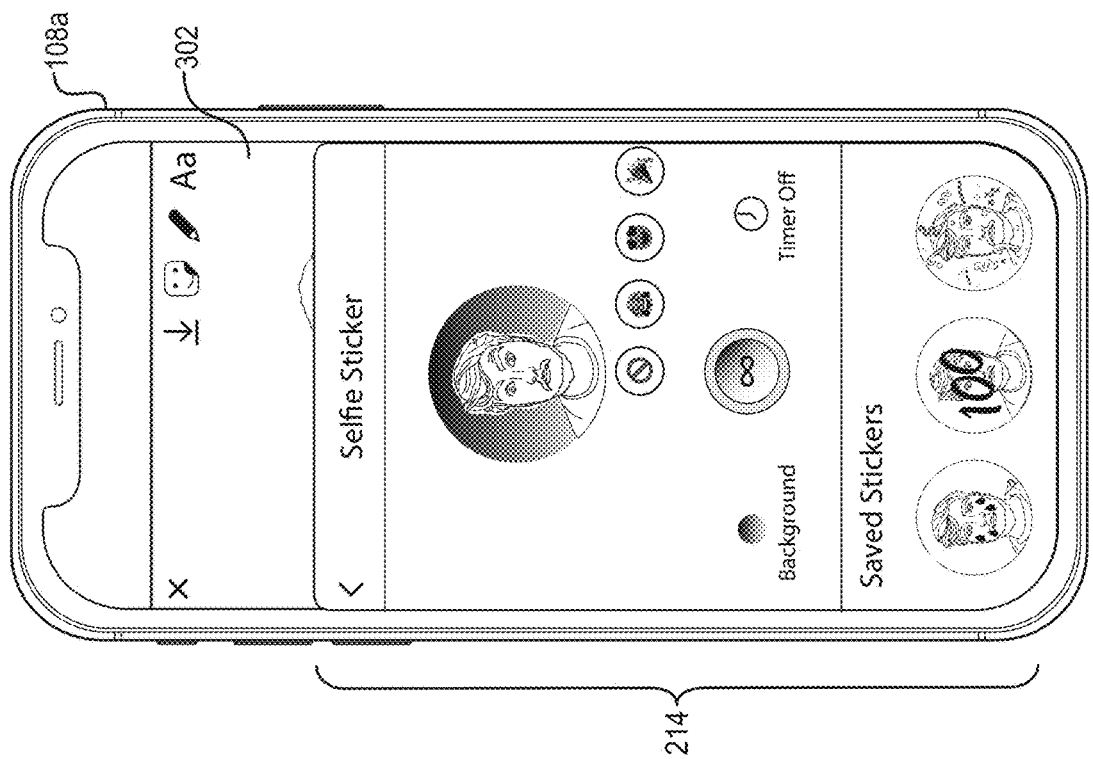

In response to a detected selection of the selfie option 212, the personalized reaction system 102 can provide the same selfie configuration options discussed above with regard to FIGS. 2C, 2D, and 2F. For example, as shown in FIG. 3C, in response to the detected selection of the selfie option 212, the personalized reaction system 102 can provide the selfie configuration overlay 214 on the ephemeral content display 302. Based on the detected selections of elements within the selfie configuration overlay 214, the personalized reaction system 102 can configure and generate a customized, personalized selfie reaction-element, as discussed above.

Additionally or alternatively, the personalized reaction system 102 can provide previously generated customized, personalized selfie reaction-elements for use in connection with ephemeral content. For example, as shown in FIG. 3D, in response to a detected selection of the personalized selfie reaction-element 228b, the personalized reaction system 102 can enable the send element 232 associated with that element.

Figure 3E:

As shown in FIG. 3E, in response to a detected selection of the send element 232, the personalized reaction system 102 can add the personalized selfie reaction-element 228b to the ephemeral content within the ephemeral content display 302. In one or more embodiments, the position of the personalized selfie reaction-element 228b is changeable. For example, in response to a touch gesture in connection with the personalized selfie reaction-element 228b (e.g., a press-and-slide touch gesture), the personalized reaction system 102 can move the personalized selfie reaction-element 228b in accordance with the detected touch gesture. Alternatively, the personalized reaction system 102 can automatically place the personalized selfie reaction-element 228b based on an analysis of the underlying ephemeral content. For example, the personalized reaction system 102 can automatically place the personalized selfie reaction-element 228b so as to avoid placement over a face, over an item of prominence, over an area of interest, etc.

After adding the personalized selfie reaction-element 228b to the user's ephemeral content, the personalized reaction system 102 can make the now-enhanced ephemeral content available via the networking system 104. For example, the personalized reaction system 102 can add the ephemeral content to the ephemeral content collection associated with the user of the client-computing device 108a. Other co-users associated with the user of the client-computing device 108a (e.g., the user's "friends") can view the enhanced ephemeral content within user's ephemeral content collection via the networking system 104 for as long as the enhanced ephemeral content is available.

Figure 4B:
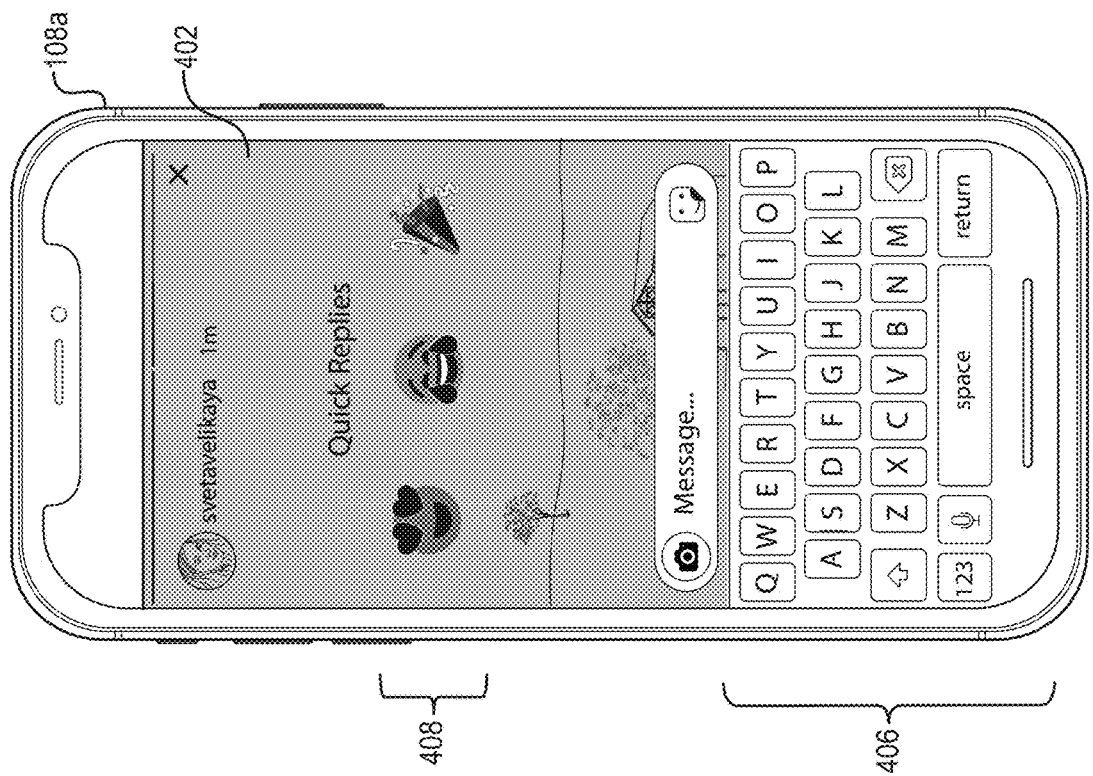
FIGS. 4A-4F illustrate a series of graphical user interfaces that the personalized reaction system can provide in configuring and generating a personalized selfie reaction-element for use in connection with a co-user's ephemeral content in accordance with one or more embodiments.
Figure 4A:
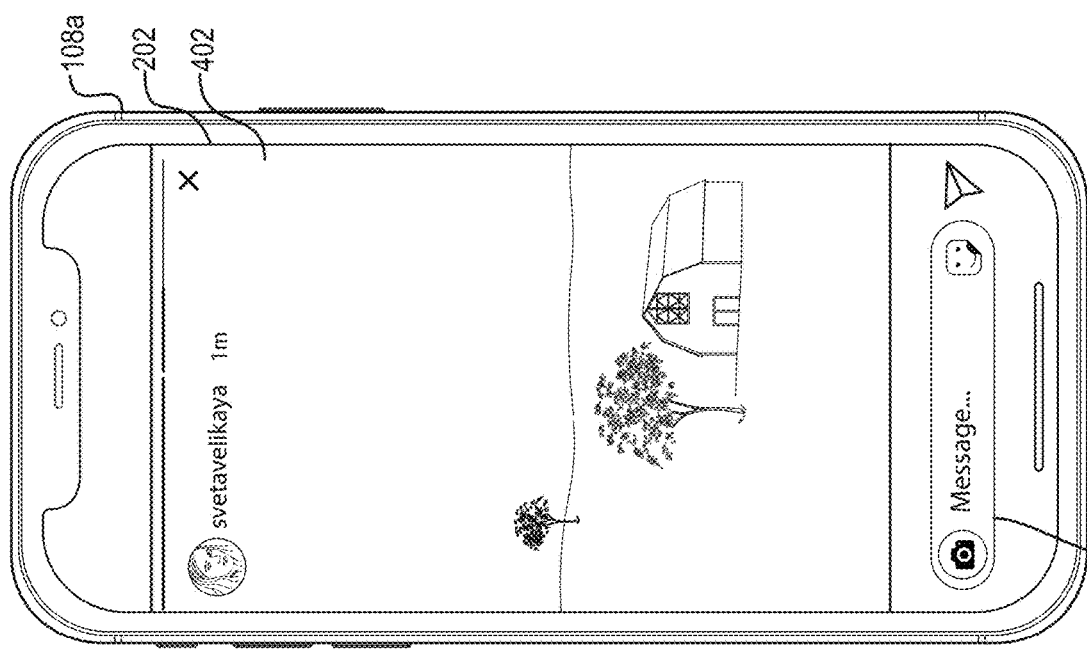

In addition to enabling a user to configure and add customized, personalized selfie reaction-elements to their own ephemeral content, the personalized reaction system 102 also enables users to configure and add customized, personalized selfie reaction-elements to other users' ephemeral content. For example, FIG. 4A illustrates a co-user ephemeral content display 402 on the touch screen display 202 of the client-computing device 108a. In one or more embodiments, the networking system 104 enables users to view the ephemeral content collections of co-users (e.g., "friends") via the networking system application (e.g., the networking system application 110a). In at least one embodiment, the networking system 104 provides the co-user's ephemeral content collection by automatically playing or displaying multi-media items in the co-user ephemeral content display 402.

In one or more embodiments, the networking system 104 enables a user to comment, reply, or otherwise react to a co-user's ephemeral content. For example, in response to a detected selection of the text box 404, the networking system application 110a can provide a touch screen keyboard 406, as shown in FIG. 4B. The networking system 104 can accept text input via the touch screen keyboard 406 to generate an electronic communication between the users of the client-computing devices 108a and 108b. Furthermore, as shown in FIG. 4B, the personalized reaction system 102 can provide one or more quick reply elements 408.

Figure 4D:
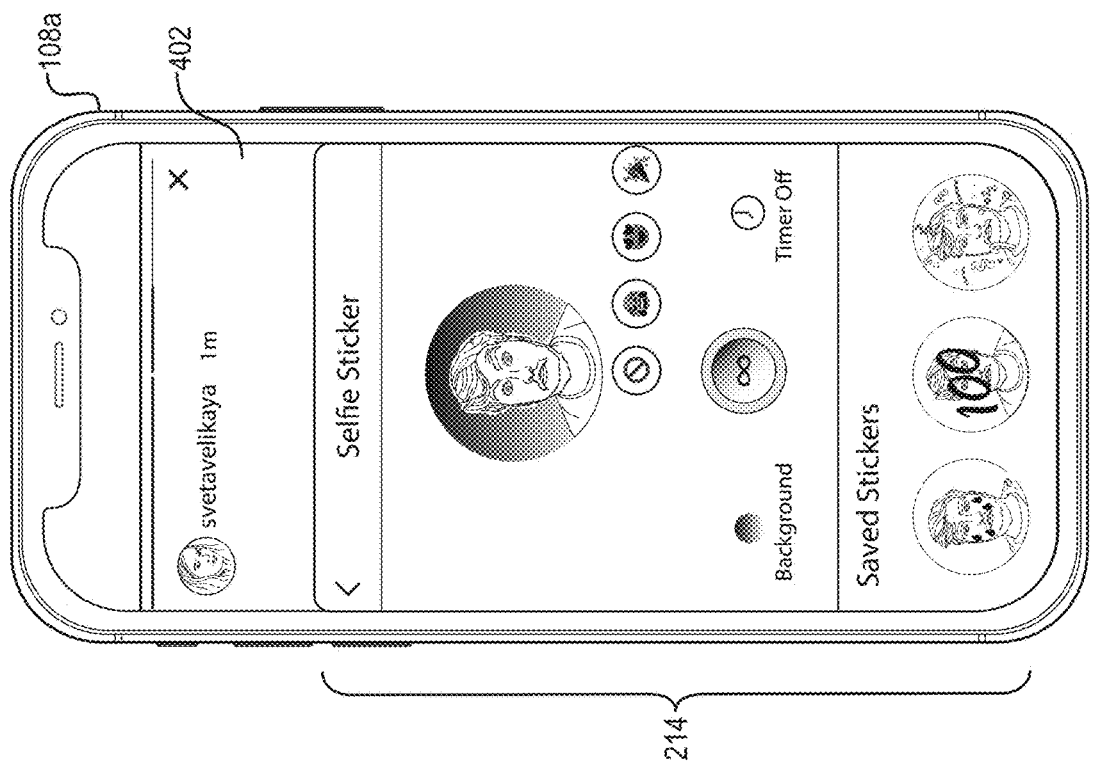
Figure 4C:
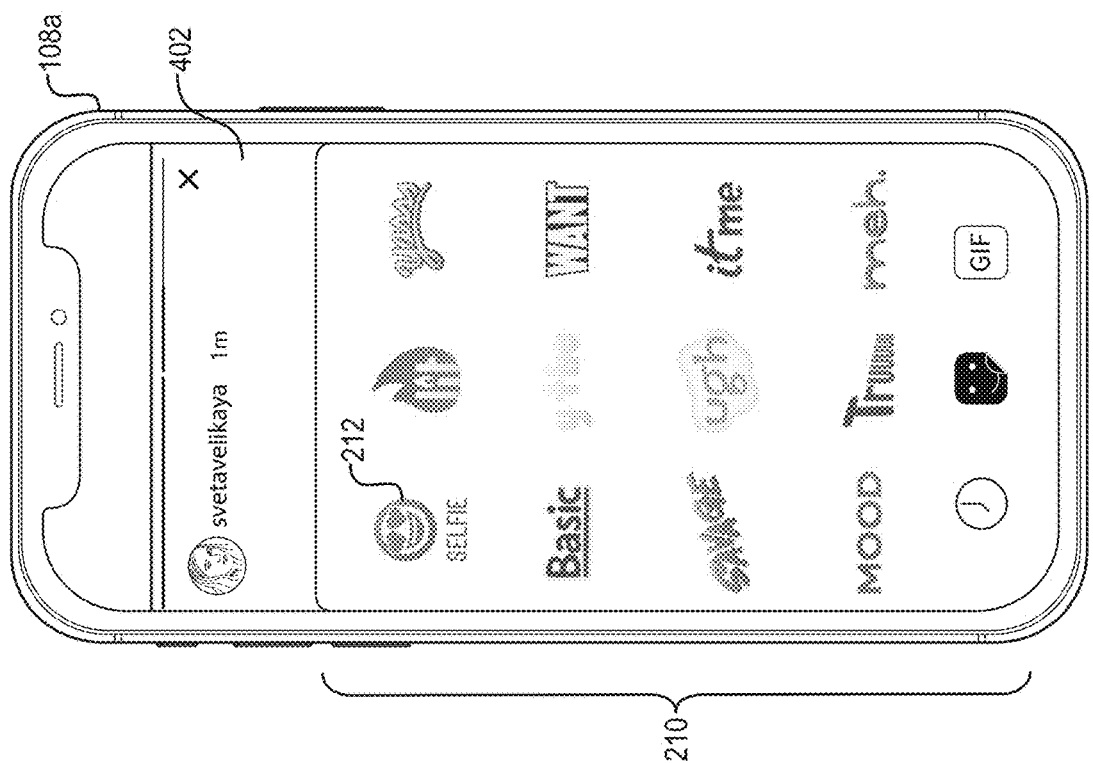

As discussed above with regard to FIGS. 2B and 3B, in response to detected user input (e.g., a swipe-up touch gesture), the personalized reaction system 102 can provide the options overlay 210 on top of the co-user ephemeral content display 402, as shown in FIG. 4C. In response to a detected selection of the selfie option 212, the personalized reaction system 102 can provide the same selfie configuration options discussed above. For example, as shown in FIG. 4D, in response to the detected selection of the selfie option 212, the personalized reaction system 102 can provide the selfie configuration overlay 214 on the co-user ephemeral content display 402. Based on the detected selections of elements within the selfie configuration overlay 214, the personalized reaction system 102 can configure and generate a customized, personalized selfie reaction-element, as discussed above.

Additionally or alternatively, the personalized reaction system 102 can provide previously generated customized, personalized selfie reaction-elements for use in connection with ephemeral content. For example, as shown in FIG. 4E, in response to a detected selection of the personalized selfie reaction-element 228b, the personalized reaction system 102 can enable the send element 232 associated with that element.

Figure 4F:
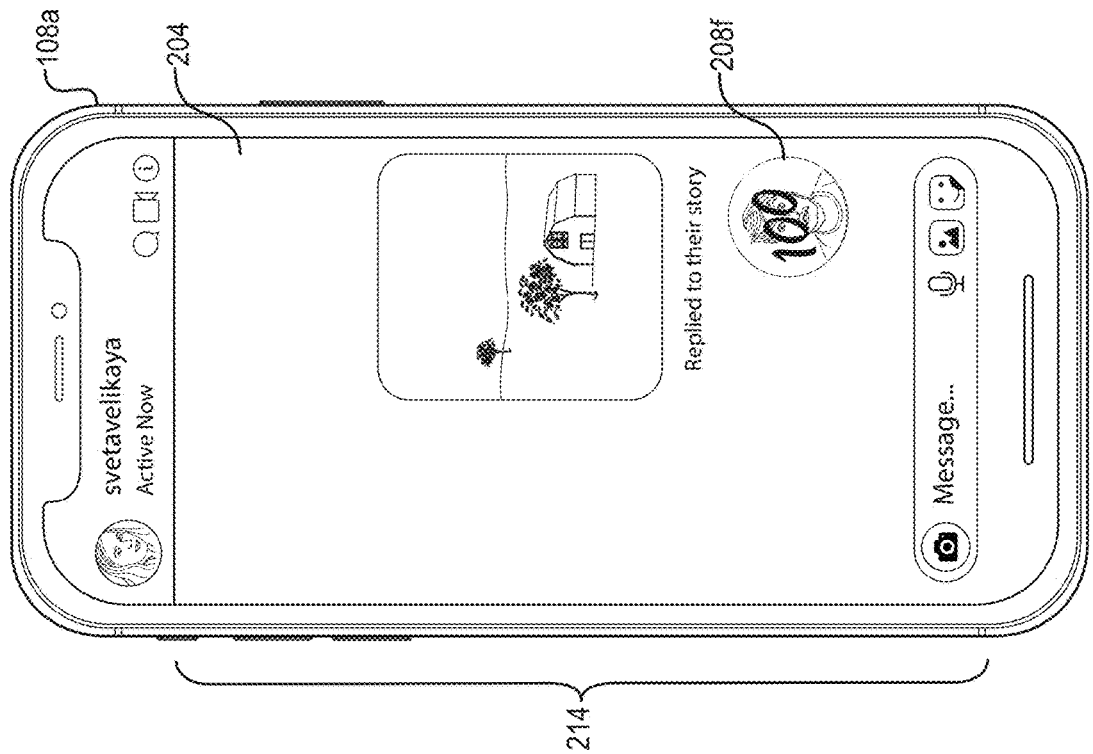
Figure 4E:
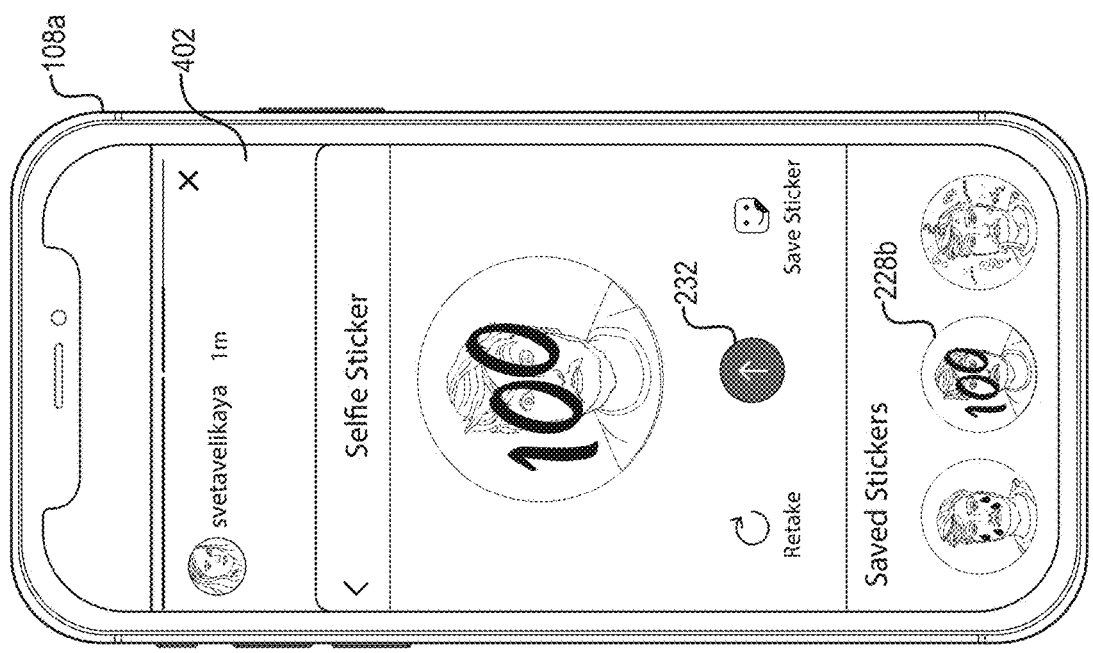

As shown in FIG. 4F, in response to a detected selection of the send element 232, the personalized reaction system 102 can associate the personalized selfie reaction-element 228b with the co-user's ephemeral content (e.g., provided via the co-user ephemeral content display 402) by generating or adding to a communication thread 206 between the user of the client-computing device 108a and the co-user associated with the co-user ephemeral content. For example, in response to the detected selection of the send element 232, the personalized reaction system 102 can generate an electronic communication 208e including a representative frame from the co-user's ephemeral content. The personalized reaction system 102 can then generate an electronic communication 208f including the personalized selfie reaction-element 228b. As discussed above, if the personalized selfie reaction-element 228c includes any augmented reality enhancements or other effects (e.g., auto-looping multi-media recording, black-and-white coloring, gradient color background, etc.), the personalized reaction system 102 can generate the electronic communication 208f to further reflect those enhancements and effects.

Figure 5B:
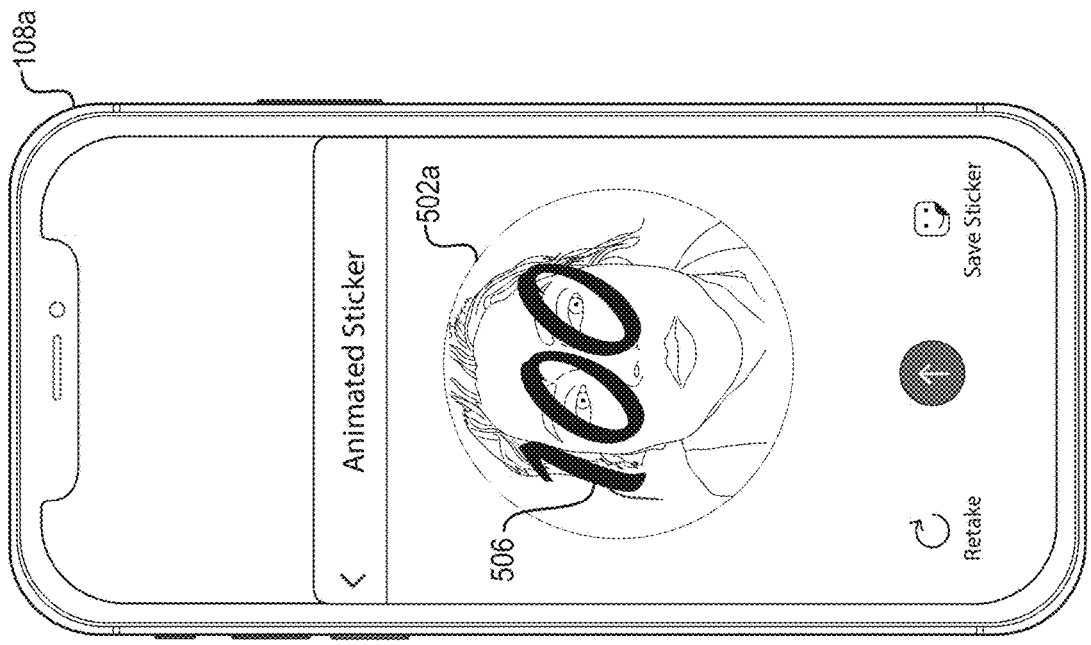
FIG. 5A-5D illustrate a series of graphical user interfaces that the personalized reaction system can provide in selecting augmented reality enhancements for use in generating a personalized selfie reaction-element in accordance with one or more embodiments.
Figure 5A:
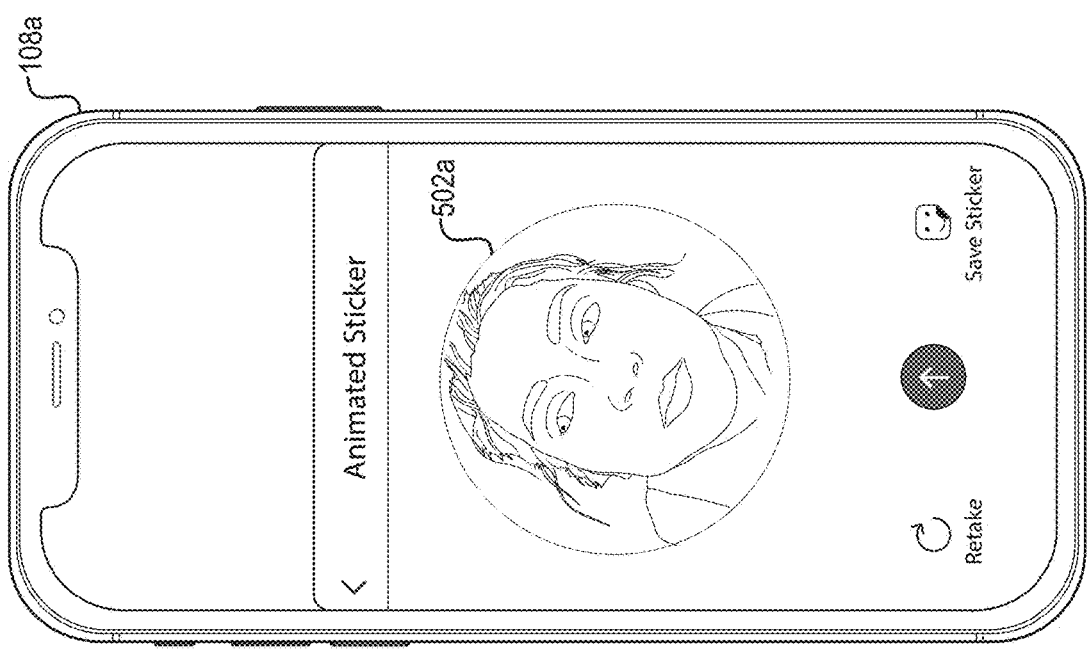
Figure 5D:
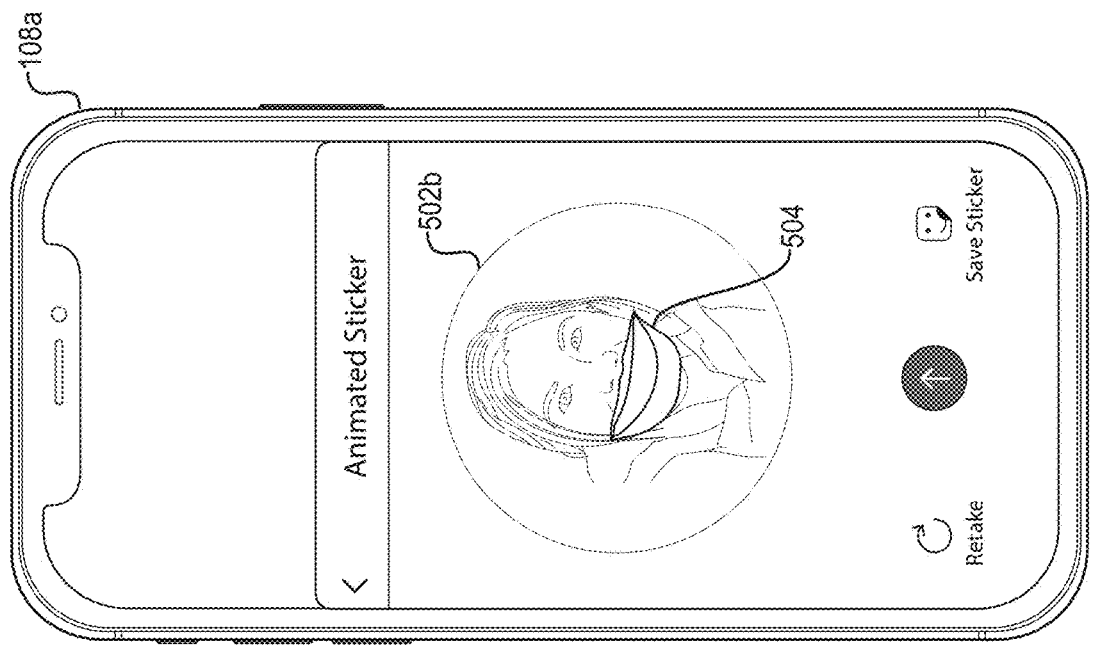
Figure 5C:
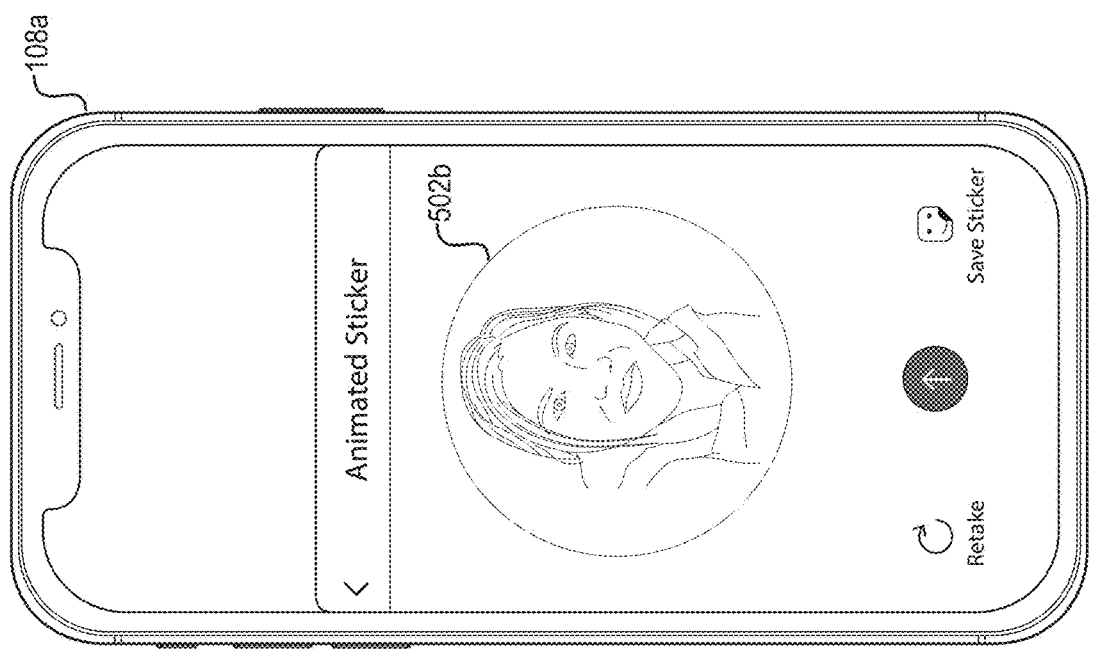

As discussed above, the personalized reaction system 102 can provide and incorporate various augmented reality enhancements in connection with customized, personalized selfie reaction-element. FIGS. 5A-5D illustrate different types of augmented reality enhancements utilized by the personalized reaction system 102. For example, FIGS. 5A and 5B illustrate an overlay-type augmented reality enhancement. FIGS. 5C and 5D illustrate an alteration-type augmented reality enhancement.

FIG. 5A shows a captured multi-media recording 502a of a user of the client-computing device 108a. After a detected user-selection of an overlay-type augmented reality enhancement 506 (e.g., the "100" augmented reality enhancement) as described above, the personalized reaction system 102 can overlay the selected augmented reality enhancement 506 on the multi-media recording 502a, as shown in FIG. 5B. In one or more embodiments, the personalized reaction system 102 can automatically place the selected augmented reality enhancement 506. For example, the personalized reaction system 102 can perform facial recognition to appropriately place the augmented reality enhancement 506 (e.g., with the zeroes of the "100" over the user's eyes).

FIG. 5C shows a captured multi-media recording 502b of a user of the client-computing device 108a. After a detected user-selection of an alteration-type augmented reality enhancement 504 (e.g., the "big lips" augmented reality enhancement) as described above, the personalized reaction system 102 can incorporate the selected augmented reality enhancement 504, as shown in FIG. 5D. In one or more embodiments, the personalized reaction system 102 incorporates the selected augmented reality enhancement 504 by performing facial recognition to identify the relevant portions of the user's face (e.g., the user's lips). The personalized reaction system 102 can further utilize image editing functionality to alter an appearance of the relevant portions of the user's face (e.g., enlarge the user's lips).

Figure 6:
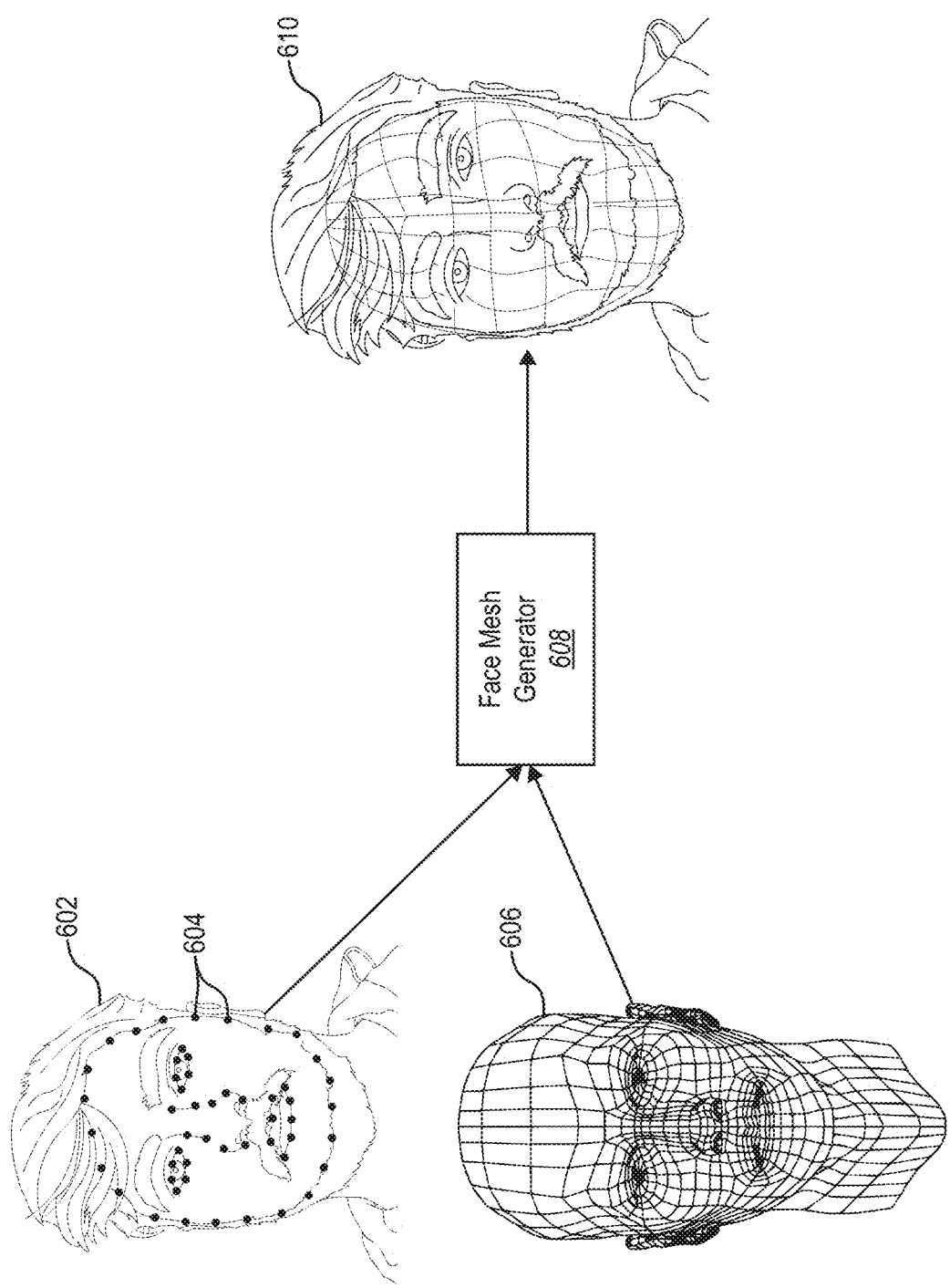
FIG. 6 illustrates a flowchart of generating an augmented reality model of a user's face for use in positioning an augmented reality enhancement in accordance with one or more embodiments.

As just discussed, the personalized reaction system 102 can incorporate selected augmented reality enhancements into a multi-media item to generate a personalized selfie reaction-element. FIG. 6 provides additional information regard the technical process utilized by the personalized reaction system 102 to incorporate augmented reality enhancements, in one or more embodiments. For example, during a process of incorporating an augmented reality enhancement into a multi-media item, in one or more embodiments, the personalized reaction system 102 generates a mesh model for a face. The personalized reaction system 102 can generate the mesh model for the face in a variety of ways. As an illustrative example shown in FIG. 6, the personalized reaction system 102 can generate a feature map 602 (e.g., a two-dimensional mapping) for a face including reference features 604 positioned about a face of a user shown within a multi-media item. In one or more embodiments, the personalized reaction system 102 analyzes one or more video frames to generate the feature map 602 including detected reference features 604.

As shown in FIG. 6, the feature map 602 includes detected edges of facial features including, for example, eyes, eyebrows, a nose, lips, and other detected features of the face. In addition to generally mapping detected objects, the personalized reaction system 102 can further map contours, wrinkles, and other more detailed features of the detected face. In one or more embodiments, the personalized reaction system 102 can map coloring features and other appearance-based features shown within one or more images of the face.

While FIG. 6 shows an example in which a single image of a face is mapped, the personalized reaction system 102 can further refine identified locations of the reference features 604 by analyzing multiple video frames (e.g., consecutive video frames) of the captured camera viewfinder stream or multi-media item. As an example, the personalized reaction system 102 can analyze an initial frame of a camera stream (e.g., a key frame) and further compute locations of the reference features 604 at previous or subsequent video frames. The personalized reaction system 102 can further apply weighting factors based on detected movement between frames and estimation of optical flow between video frames. In one or more embodiments, the personalized reaction system 102 utilizes the following algorithms to refine determined locations of reference features 604:

$$x_i^t = \lambda_i x_{f,i}^t + (1 - \lambda_i) x_{o,i}^t \text{ for } 1 \leq i \leq m$$
$$x_o^t = x^T + \sum_{T \leq i < t} w^i$$

Where t is the time of a video frame, $0 \leq \lambda \leq 1$ is a weighting factor, $x_f^t$ is a feature position obtained at time t, and $x_o^t$ is an estimated feature location. Further, $x^T$ denotes a feature position in a key frame $f_t^T$ and $w^i$ is the forward optical flow vector from t to t+1 in $x_o^t$. In one or more embodiments, the personalized reaction system 102 utilizes the optical flow-based feature correction process described in *Reconstructing Detailed Dynamic Face Geometry From Monocular Video* by Garrido et al., which is incorporated herein by reference in its entirety.

In addition to generating and refining the feature map 602, the personalized reaction system 102 further utilizes a default mesh model 606 in conjunction with the feature map 602 to generate a personalized mesh model 610 for a detected face in a multi-media item. In particular, in one or more embodiments, the personalized reaction system 102 identifies a default mesh model 606 including a three-dimensional model of a generic face that includes a number of vertices that define various points on the face. The default mesh model 606 can include any number of vertices and gridlines depending on computing capabilities of a client device. In addition, the personalized reaction system 102 can select a particular default mesh model 606 based on a detected position or angle of the detected face to further improve upon the accuracy of generating the personalized mesh model 610.

As shown in FIG. 6, the personalized reaction system 102 can implement a face mesh generator 608 to generate a personalized mesh model 610 based on the default mesh model 606 and including grid lines and vertices that reflect locations of the reference features 604 of the feature map 602. In particular, in one or more embodiments, the personalized reaction system 102 generates the personalized mesh model 610 by manipulating vertices of the default mesh model 606 based on locations of the reference features 604. In one or more embodiments, the personalized reaction system 102 refines the personalized mesh model 610 over time to reflect refined positions of the reference features 604 and/or to reflect more accurate or efficient modeling methods utilized over time to generate the personalized mesh model 610.

As shown in FIG. 6, the personalized reaction system 102 can generate a single personalized mesh model 610 including a three-dimensional mesh that reflects an entire face, portion of a face, and/or larger profile including the neck and torso of an individual. In one or more embodiments, the personalized reaction system 102 generates multiple personalized mesh models for different angles of a face or profile. For example, the personalized reaction system 102 can generate and utilize a personalized mesh model 610 based on detecting a face looking at the camera in the multi-media item. The personalized reaction system 102 can similarly generate and utilize a different personalized mesh model based on different angles of an individual looking down, up, to the side, or based on a variety of angles of the face to improve accuracy of providing a digital presentation.

Accordingly, in at least one embodiment, the personalized reaction system 102 can render a personalized selfie reaction-element by positioning a selected augmented reality enhancement on a personalized mesh model 610. For example, the personalized reaction system 102 can render the selected augmented reality enhancement at a position on the user's detected face within the multi-media item in accordance with vertices of the selected augmented reality enhancement (e.g., indicated by metadata associated with the selected augmented reality enhancement) and corresponding reference features 604 of the personalized mesh model 610. As the user moves within the multi-media item (e.g., a multi-media recording), the personalized reaction system 102 can update a position of the augmented reality enhancement to correspond to changing locations of the references features 604, thereby providing a realistic representation of the augmented reality enhancement in connection with the user.

Figure 7:
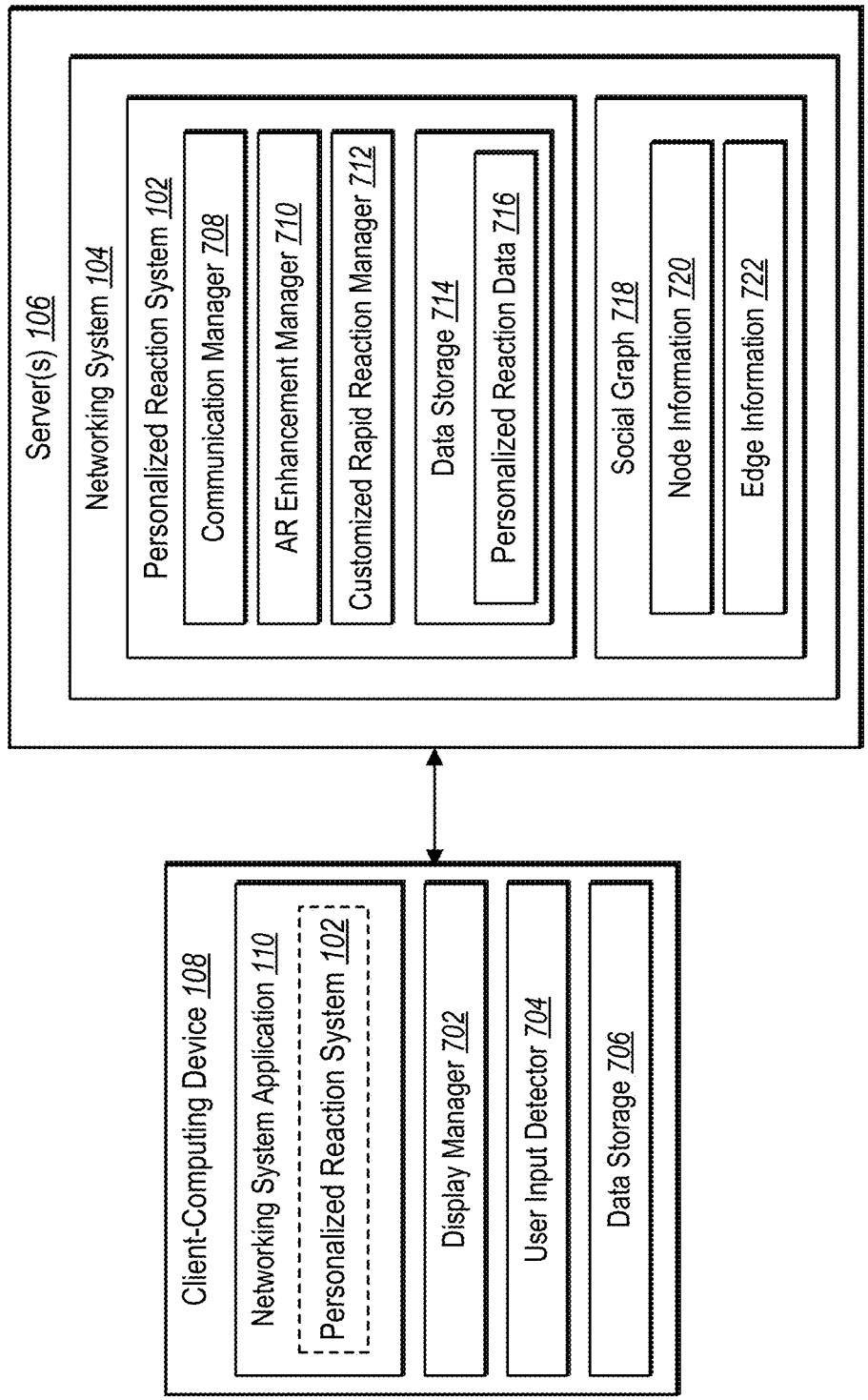
FIG. 7 illustrates a detailed schematic diagram of the personalized reaction system in accordance with one or more embodiments.

FIG. 7 illustrates a schematic diagram illustrating an example embodiment of the personalized reaction system 102. As previously shown in FIG. 1, the personalized reaction system 102 is implemented by a networking system 104 on the server(s) 106, is communicatively connected to one or more client-computing devices 108 (e.g., the client-computing devices 108a, 108b as shown in FIG. 1), and includes various components for performing the processes and features described herein. As shown in FIG. 7, the client-computing device 108 includes the networking system application 110, a display manager 702, a user input detector 704, and data storage 706. Also, as shown in FIG. 7, the server(s) 106 hosts the networking system 104 that includes the personalized reaction system 102 including a communication manager 708, an AR enhancement manager 710, a customized personalized reaction manager 712, and a data storage 714 including personalized reaction data 716. The networking system 104 also includes a social graph 718 including node information 720 and edge information 722. In some embodiments, as indicated by the dashed line, the networking system application 110 can include a portion or all of the personalized reaction system 102.

In at least one embodiment, the personalized reaction system 102 accesses the networking system 104 in order to identify and analyze social networking system user data. Accordingly, as shown in FIG. 7, the networking system 104 includes the social graph 718 for representing a plurality of users, actions, and concepts. For example, in one or more embodiments, the social graph 718 is accessible by the networking system 104. In one or more embodiments, the social graph 718 includes node information 720 and edge information 722. Node information 720 of the social graph 718 stores information including, for example, nodes for users and nodes for repositories. Edge information 722 of the social graph 718 stores information including relationship between nodes and/or actions occurring within the networking system 104. Further details regarding the networking system 104, the social graph 718, edges, and nodes are presented below with respect to FIG. 10.

Each of the components 102, 110, and 702-706 of the client-computing device 108, and the components 102, and 708-722 of the networking system 104, can be implemented using a computing device including at least one processor executing instructions that cause the personalized reaction system 102 to perform the processes described herein. In some embodiments, the components of the personalized reaction system 102 can be implemented by the server(s) 106, or across multiple server devices. Alternatively, a combination of one or more server devices and one or more client devices can implement the components of the personalized reaction system 102. Additionally, the components of the personalized reaction system 102 can comprise a combination of computer-executable instructions and hardware.

In one or more embodiments, the networking system application 110 is a native application installed on the client-computing device 108. For example, the networking system application 110 can be mobile application that install and run on a mobile device, such as a smart phone or tablet computer. Alternatively, the networking system application 110 can be desktop application, widget, or other form of a native computer program. Furthermore, the networking system application 110 may be a remote application accessed by the client-computing device 108. For example, the networking system application 110 may be web applications that are executed within a web browser of the client-computing device 108.

As mentioned above, and as shown in FIG. 7, the client-computing device 108 includes the networking system application 110. In one or more embodiments, the networking system application 110 enables the user of the client-computing device 108 to interact with one or more features of the networking system 104. Further, in one or more embodiments, the networking system application 110 enables the user of the client-computing device 108 to interact with one or more features of the personalized reaction system 102. For example, the networking system application 110 enables the user of the client-computing device 108 to scroll through a newsfeed, read posts, compose electronic messages, capture digital photographs and videos, configure and view ephemeral content, and otherwise interact with the networking system 104.

Additionally, in one or more embodiments, the networking system application 110 also collects contextual information from the client-computing device 108 and provides the collected information to the networking system 104. For example, in one or more embodiments, the networking system application 110 accesses system files, application usage files, and other system information to identify GPS data (e.g., global positioning satellite data), camera viewfinder data, gyroscopic data, application usage data, and a networking system unique identifier associated with the user of the client-computing device 108. The networking system application 110 then provides this data to the networking system 104 for use in providing augmented reality enhancements and determining augmented reality enhancement placement.

Also shown in FIG. 7, the client-computing device 108 includes the display manager 702. In one or more embodiments, the display manager 702 generates, provides, manages, and/or controls one or more graphical user interfaces that allow a user to interact with features of the personalized reaction system 102. For example, the display manager 702 generates a graphical user interface ("GUI") that includes the selfie configuration overlay 214 including various selectable controls. In at least one embodiment, the display manager 702 further overlays one or more selected enhancements and effects on a captured multi-media item in order to provide a preview of how a personalized selfie reaction-element might look. The display manager 702 can additionally generate other GUIs that assist a user in creating a social media content and sending the social media content to others.

More specifically, the display manager 702 facilitates the display of a graphical user interface. For example, the display manager 702 may compose the graphical user interface of a plurality of graphical components, objects, and/or elements that allow a user to engage with features of the personalized reaction system 102. More particularly, the display manager 702 may direct a client-computing device to display a group of graphical components, objects, and/or elements that enable a user to interact with various features of the personalized reaction system 102.

In addition, the display manager 702 directs a client-computing device to display one or more graphical objects, controls, or elements that facilitate user input for interacting with various features of the personalized reaction system 102. To illustrate, the display manager 702 provides a graphical user interface that allows a user to configure a customized, personalized selfie reaction-element. The display manager 702 also facilitates the input of text or other data for the purpose of interacting with one or more features of the personalized reaction system 102. For example, the display manager 702 provides a GUI that that functions in connection with a touch screen. A user can interact with the touch screen using one or more touch gestures to select augmented reality enhancements, capture multi-media items, input text, manipulate displays, and so forth.

Furthermore, the display manager 702 is capable of transitioning between two or more GUIs. For example, in one embodiment, the display manager 702 provides a communication thread GUI (e.g., the communication thread GUI 204). Later, in response to detected input from the user, the display manager 702 transitions to or overlays a second GUI that includes the selfie configuration overlay 214.

As shown by the dotted-lines in FIG. 7, optionally, the networking system application 110 includes the personalized reaction system 102. For example, in one or more embodiments, the networking system application 110 implemented by the client-computing device 108 comprises the communication manager 708, the AR enhancement manager 710, the customized personalized reaction manager 712, and optionally the data storage 714 and personalized reaction data 716. Thus, in one or more embodiments, the methods described herein above can be implemented locally by the client-computing device 108. Alternatively, as described below, the server(s) 106 can implement the personalized reaction system 102.

As further illustrated in FIG. 7, the personalized reaction system 102 includes the user input detector 704. In one or more embodiments, the user input detector 704 detects, receives, and/or facilitates user input. In some examples, the user input detector 704 detects one or more user interactions with respect to a user interface or GUI. As referred to herein, a "user interaction" means a single interaction, or combination of interactions, received from a user by way of one or more input devices. For example, the user input detector 704 detects a user interaction from a keyboard, mouse, touch page, touch screen, and/or any other input device. In the event the client-computing device includes a touch screen, the user input detector 704 detects one or more touch gestures (e.g., swipe gestures, tap gestures, pinch gestures, reverse pinch gestures) from a user that forms a user interaction. In some examples, a user can provide the touch gestures in relation to and/or directed at one or more graphical objects or graphical elements of a user interface or GUI.

The user input detector 704 may additionally, or alternatively, receive data representative of a user interaction. For example, the user input detector 704 may receive one or more user configurable parameters from a user, one or more commands from the user, and/or other suitable user input. The user input detector 704 may receive input data from one or more components of the personalized reaction system 102 or from one or more remote locations.

The personalized reaction system 102 performs one or more functions in response to the user input detector 704 detecting user input and/or receiving other data. Generally, a user can control, navigate within, and otherwise use the personalized reaction system 102 by providing one or more user inputs that the user input detector 704 can detect.

As illustrated in FIG. 7, the client-computing device 108 also includes the data storage 706. The data storage 706 can includes social media content, multi-media items, augmented reality enhancements, and other electronic communication data. In one or more embodiments, social media content includes social media information, such as described herein.

As shown in FIG. 7, and as mentioned above, the server(s) 106 hosts the networking system 104. In one or more embodiments, the networking system 104 provides communication threads, live video broadcasts, digital media items, networking system posts, electronic messages, and other networking system features to one or more networking system users (e.g., by way of a newsfeed, a communication thread, an ephemeral content collection, a timeline, a profile, a "wall," a live video broadcast display). Additionally, the networking system 104 includes the social graph 718, as described above. As further illustrated in FIG. 7, and as mentioned above, the networking system 104 includes the personalized reaction system 102 including a communication manager 708, an AR enhancement manager 710, a customized personalized reaction manager 712, and a data storage 714 storing personalized reaction data 716.

As just mentioned, the personalized reaction system 102 includes a communication manager 708. In one or more embodiments, the communication manager 708 manages all communication between client-computing devices and the personalized reaction system 102 via the networking system 104. For example, the communication manager 708 can send and receive social media content such as, but not limited to, electronic communications, ephemeral content, posts, interactions, and other social networking activity.

As mentioned above, the personalized reaction system 102 includes an AR enhancement manager 710. In one or more embodiments, the AR enhancement manager 710 manages AR enhancements for use in personalized selfie reaction-element creation. For example, the AR enhancement manager 710 can store AR enhancements in various ways. To illustrate, the AR enhancement manager 710 can store AR enhancements (e.g., in the data storage 714) based on title (e.g., "crying eyes," "celebration," "big lips," etc.), based on type (e.g., overlay or altering), based on metadata associated with each AR enhancement.

In one or more embodiment, the AR enhancement manager 710 also provides AR enhancements in various ways. For example, in response to determining that a personalized selfie reaction-element configuration is initiated on the client-computing device 108, the AR enhancement manager 710 can provide a threshold number of AR enhancements to the client-computing device 108. To illustrate, in one embodiment, the AR enhancement manager 710 can identify and provide a top threshold number of popular AR enhancements from across the networking system 104. For example, the AR enhancement manager 710 can analyze use information associated with each available AR enhancement to identify AR enhancements that are used most frequently across networking system users in connection with social media content (e.g., in selfie elements, electronic communications, ephemeral content). In some embodiments, the AR enhancement manager 710 can determine popularity of AR enhancement across geographic areas, demographic groups, social media content type (e.g., ephemeral content, communication threads, posts), or networking system groups. The AR enhancement manager 710 can then provide a predetermined number (e.g., five) of the most popular AR enhancements to the client-computing device 108.

Additionally or alternatively, in response to determining that a personalized selfie reaction-element configuration is initiated on the client-computing device 108, the AR enhancement manager 710 can provide a threshold number of AR enhancements to the client-computing device 108 based on a use history associated with the client-computing device 108. For example, the AR enhancement manager 710 can track a use history of AR elements associated with the client-computing device 108 in order to determine one or more frequently used AR enhancements in association with the client-computing device 108. The AR enhancement manager 710 can then provide a predetermined number of most frequently used AR enhancements to the client-computing device 108.

As shown in FIG. 7, and as mentioned above, the personalized reaction system 102 also includes a customized personalized reaction manager 712. In one or more embodiments, the customized personalized reaction manager 712 generates a personalized selfie reaction-element based on configurations and selections made via the networking system application 110 on the client-computing device 108. For example, in response to a send event (e.g., a selection of the send element 232), the customized personalized reaction manager 712 can receive a multi-media item in addition to other configuration information (e.g., a background gradient color selection, an AR enhancement selection). The customized personalized reaction manager 712 can then generate a personalized selfie reaction-element by applying the selected configurations to the multi-media item.

In one or more embodiments, the customized personalized reaction manager 712 begins generating a personalized selfie reaction-element by editing the received multi-media item. For example, if the received multi-media item is a multi-media image (e.g., a digital photograph) and depending on the received configuration information, the customized personalized reaction manager 712 can utilize facial detection techniques to crop out a background around the face and torso of a user detected in the multi-media image. If the received multi-media item is a multi-media recording of the user, the customized personalized reaction manager 712 can utilize facial detection techniques to crop out a background around the face and torso of the user detected in every frame of the multi-media recording. Additionally, the customized personalized reaction manager 712 can convert the multi-media image or every frame of the multi-media recording to black-and-white. Furthermore, the customized personalized reaction manager 712 can auto-loop the frames of a multi-media recording.

In one or more embodiments, after editing the received multi-media item and depending on the received configuration information, the customized personalized reaction manager 712 can apply one or more elements and/or enhancements to the edited multi-media item. For example, the customized personalized reaction manager 712 can apply a gradient color background to the edited multi-media item. Additionally or alternatively, the customized personalized reaction manager 712 can apply any selected stickers, emoticons, or other static effects of the edited multi-media item.

In at least one embodiment, the customized personalized reaction manager 712 can also apply one or more augmented reality enhancements to the edited multi-media item. For example, the customized personalized reaction manager 712 can access metadata associated with a selected AR enhancement to determine a specified placement for the AR enhancement (e.g., over the eyes). The customized personalized reaction manager 712 can then utilize facial detection and tracking techniques to determine the one or more portions of the multi-media item where the AR enhancement should be positioned. For example, if the multi-media item is a multi-media image, the customized personalized reaction manager 712 can position the AR enhancement in connection with the determined one or more portions. If the multi-media item is a multi-media recording, the customized personalized reaction manager 712 can position the AR enhancement in connection with the determined one or more portions in each frame of the multi-media recording. In an alternative embodiment, if a user-selected placement is received (e.g., in response to a detected touch gesture at the client-computing device 108), the customized personalized reaction manager 712 can position the AR enhancement in connection with the user-selected placement.

Additionally, the customized personalized reaction manager 712 can apply a selected AR enhancement to the edited multi-media item in different ways depending on a type associated with the AR enhancement. For example, if the AR enhancement is an overlay type enhancement (e.g., "heart eyes," "crying face"), the customized personalized reaction manager 712 can overlay the AR enhancement at the correct position, as discussed above. If the AR enhancement is an alteration type enhancement (e.g., "big lips"), the customized personalized reaction manager 712 can identify the correct one or more portions of the multi-media item (e.g., utilize facial detection, computer vision, etc.), and alter the appearance of the identified one or more portions of the AR enhancement according to metadata associated with the AR enhancement.

In one or more embodiments, the customized personalized reaction manager 712 further generates a personalized selfie reaction-element by masking all or a portion of the customized, personalized selfie reaction-element. For example, in at least one embodiment, the customized personalized reaction manager 712 creates the personalized selfie reaction-element as a ".mp4," or ".gif" file type. In that configuration, the personalized selfie reaction-element has a square format shape. In order to create a circular personalized selfie reaction-element (e.g., as illustrated by the electronic communication 208f in FIG. 4F), the customized personalized reaction manager 712 can overlay a circular mask on the personalized selfie reaction-element that makes the personalized selfie reaction-element appear round.

In one or more embodiments, the customized personalized reaction manager 712 can make generated personalized selfie reaction-element available in different ways. For example, in one embodiment, the customized personalized reaction manager 712 can make generated customized, personalized selfie reaction-elements available only to the user who created them. In another embodiment, the customized personalized reaction manager 712 can make generated customized, personalized selfie reaction-elements utilized in a particular communication thread available to all the participants in that communication thread. In another embodiment, the customized personalized reaction manager 712 can make generated customized, personalized selfie reaction-elements available to the co-users (e.g., the "friends") of the user who created those selfie elements. In another embodiment, the customized personalized reaction manager 712 can make generated customized, personalized selfie reaction-elements associated with a verified account (e.g., a celebrity's selfie elements) available to all networking system users.

As illustrated in FIG. 7, and as mentioned above, the networking system 104 further includes the data storage 714. The data storage 714 includes personalized reaction data 716. In one or more embodiments, personalized reaction data 716 includes customized personalized reaction information, such as described herein.

Figure 8:
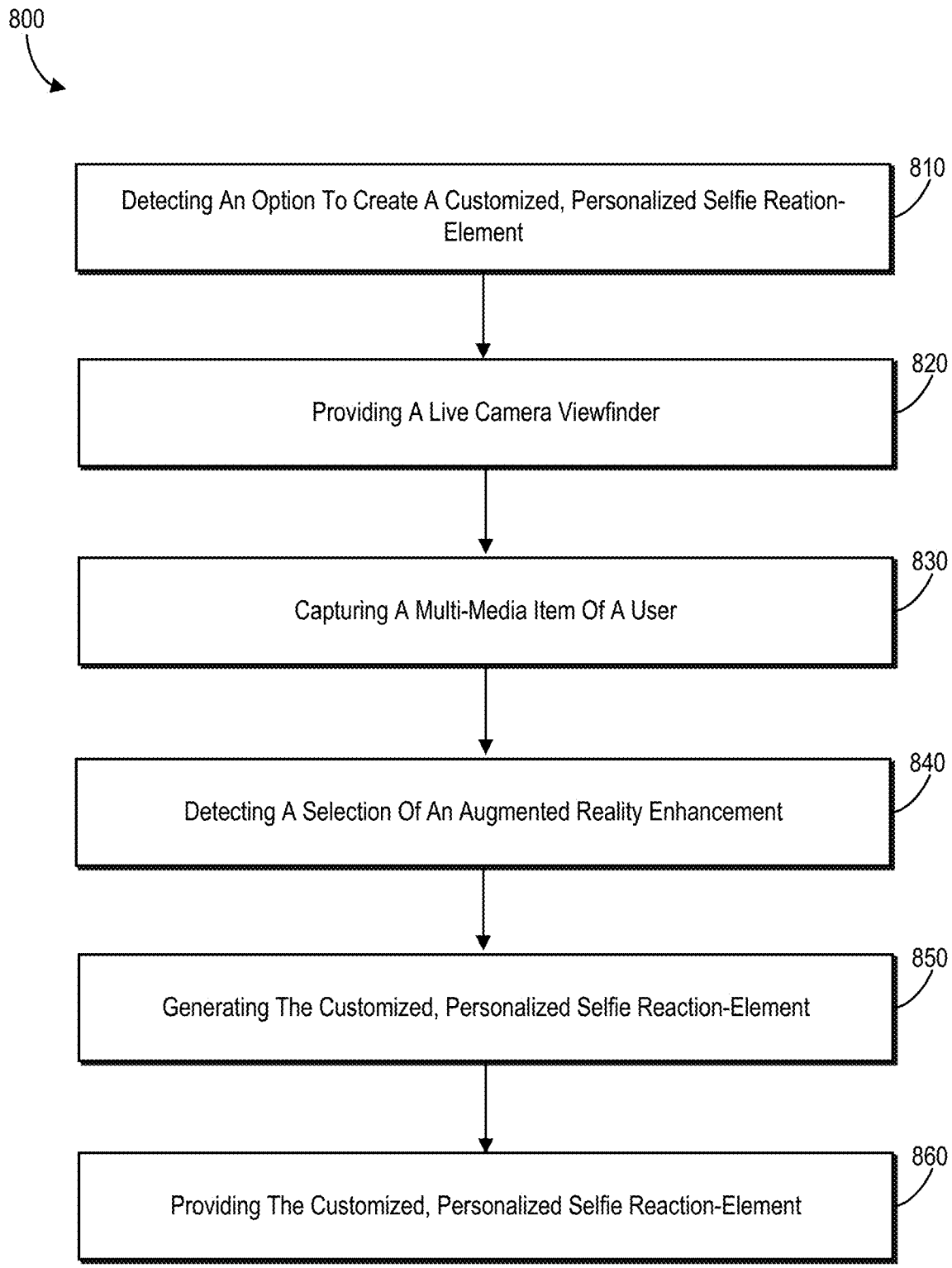
FIG. 8 illustrates a flowchart of a series of acts for generating a personalized selfie reaction-element in accordance with one or more embodiments.

Turning now to FIG. 8, this figure illustrates a flowchart of a series of acts 800 for generating customized, personalized selfie reaction-elements in accordance with one or more embodiments. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer-readable medium can comprise instructions, that when executed by one or more processors, cause a computing device to perform the acts of FIG. 8. In still further embodiments, a system can perform the acts of FIG. 8.

As shown in FIG. 8, the series of acts 800 includes an act 810 of detecting an option to create a customized, personalized selfie reaction-element. In particular, the act 810 can involve detecting a selection of an option to create a personalized selfie reaction-element in connection with social media content. For example, detecting the selection of an option to create a personalized selfie reaction-element can include detecting a swipe up touch gesture on the client-computing device.

As further shown in FIG. 8, the series of acts 800 includes an act 820 of providing a live camera viewfinder. In particular, the act 820 can involve providing, from a camera of the client-computing device, a live camera viewfinder display via a graphical user interface. For example, providing the live camera viewfinder display can include providing the live camera viewfinder display masked to mimic the shape of the eventual customized, personalized selfie reaction-element.

Also as shown in FIG. 8, the series of acts 800 includes an act 830 of capturing a multi-media recording of a user. In particular, the act 830 can involve capturing, in response to a detected selection of a capture element, a multi-media recording of a user via the camera of the client-computing device. For example, capturing the multi-media recording of a user can include capturing the multi-media recording that is the length of the detected selection of the capture element.

Additionally, the series of acts 800 includes an act 840 of detecting a selection of an augmented reality enhancement. In particular, the act 840 can involve detecting a selection of one or more augmented reality enhancements. For example, detecting a selection of one or more augmented reality enhancements can include detected a tap touch gesture on the client-computing device in connection with a displayed augmented reality enhancement.

The series of acts 800 further includes an act 850 of generating the customized, personalized selfie reaction-element. In particular, the act 850 can involve generating the personalized selfie reaction-element by combining the multi-media recording of the user and the selected one or more augmented reality enhancements. For example, in at least one embodiment, generating the personalized selfie reaction-element further includes overlaying, based on the detected face within the multi-media recording, the selected one or more augmented reality enhancements over the multi-media recording of the user. In another embodiment, generating the personalized selfie reaction-element further includes altering, based on the detected face within the multi-media recording, an appearance of one or more portions of the multi-media recording of the user based on the selected one or more augmented reality enhancements. In yet another embodiment, generating the personalized selfie reaction-element further includes automatically looping the multi-media recording of the user combined with the selected one or more augmented reality enhancements.

In one or more embodiments, the series of acts 800 further includes detecting a face associated with the user within the multi-media recording of the user. Additionally, in at least one embodiment, the series of acts 800 includes detecting a selection of a color-gradient option associated with the multi-media recording of the user, wherein generating the personalized selfie reaction-element further comprises: converting the multi-media recording to black and white; cropping a background out of the multi-media recording of the user; and adding a color-gradient background into the multi-media recording of the user. In at least one additional embodiment, the series of acts 800 includes detecting a selection of a placement location associated with the social media content, wherein providing the personalized selfie reaction-element for association with the social media content further comprises providing the placement location associated with the social media content.

Furthermore, as shown in FIG. 8, the series of acts 800 includes an act 860 of providing the customized, personalized selfie reaction-element. In particular, the act 860 can involve providing the personalized selfie reaction-element for association with the social media content. For example, providing the personalized selfie reaction-element can include providing the personalized selfie reaction-element in connection with a communication thread, or in connection with ephemeral content.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
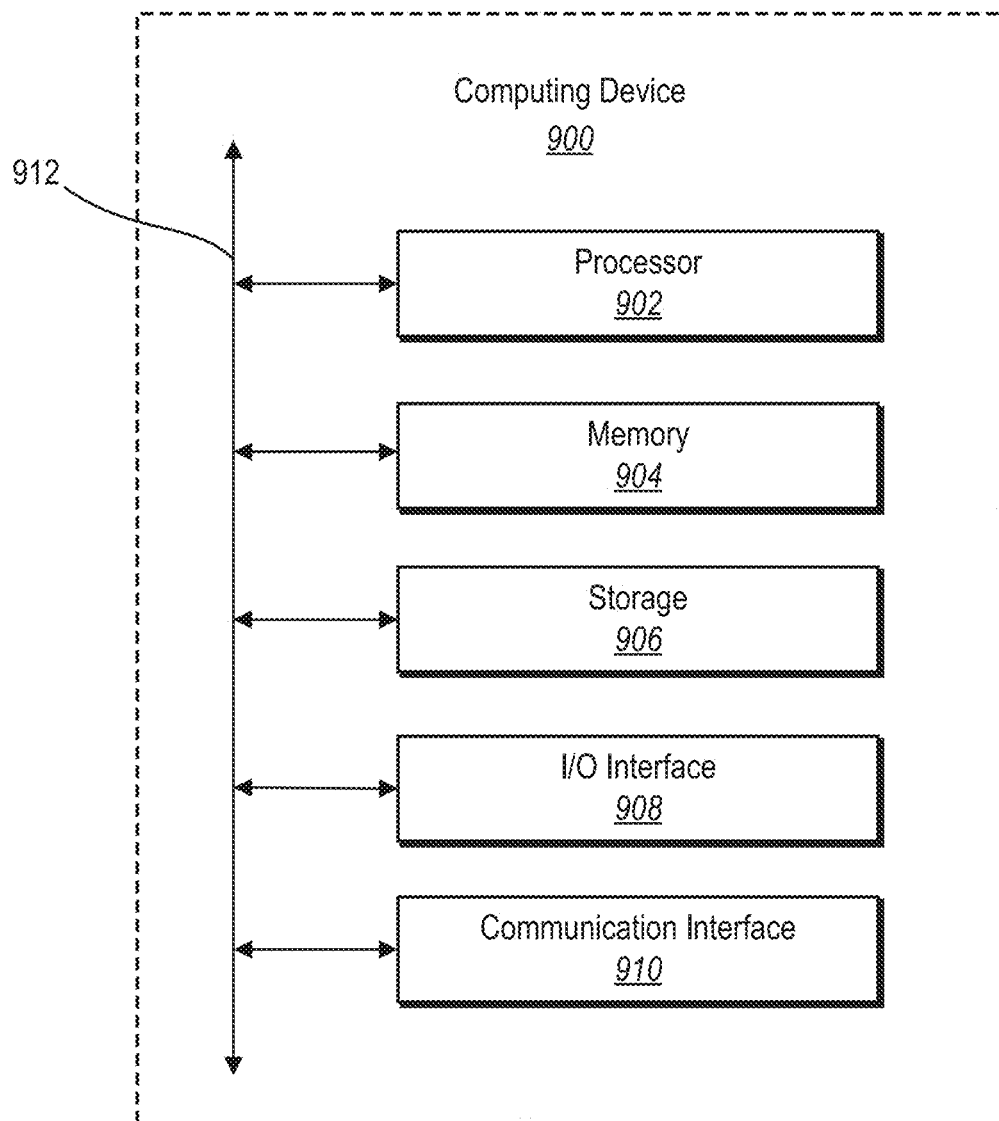
FIG. 9 illustrates a block diagram of an exemplary computing device in accordance with one or more embodiments.

FIG. 9 illustrates a block diagram of exemplary computing device 900 that may be configured to perform one or more of the processes described above. One will appreciate that one or more computing devices such as the computing device 900 may implement the personalized reaction system 102. As shown by FIG. 9, the computing device 900 can comprise a processor 902, a memory 904, a storage device 906, an I/O interface 908, and a communication interface 910, which may be communicatively coupled by way of a communication infrastructure 912. While an exemplary computing device 900 is shown in FIG. 9, the components illustrated in FIG. 9 are not intended to be limiting. Additional or alternative components may be used in other embodiments. Furthermore, in certain embodiments, the computing device 900 can include fewer components than those shown in FIG. 9. Components of the computing device 900 shown in FIG. 9 will now be described in additional detail.

In one or more embodiments, the processor 902 includes hardware for executing instructions, such as those making up a computer program. As an example and not by way of limitation, to execute instructions, the processor 902 may retrieve (or fetch) the instructions from an internal register, an internal cache, the memory 904, or the storage device 906 and decode and execute them. In one or more embodiments, the processor 902 may include one or more internal caches for data, instructions, or addresses. As an example and not by way of limitation, the processor 902 may include one or more instruction caches, one or more data caches, and one or more translation lookaside buffers (TLBs). Instructions in the instruction caches may be copies of instructions in the memory 904 or the storage device 906.

The memory 904 may be used for storing data, metadata, and programs for execution by the processor(s). The memory 904 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 904 may be internal or distributed memory.

The storage device 906 includes storage for storing data or instructions. As an example and not by way of limitation, storage device 906 can comprise a non-transitory storage medium described above. The storage device 906 may include a hard disk drive (HDD), a floppy disk drive, flash memory, an optical disc, a magneto-optical disc, magnetic tape, or a Universal Serial Bus (USB) drive or a combination of two or more of these. The storage device 906 may include removable or non-removable (or fixed) media, where appropriate. The storage device 906 may be internal or external to the computing device 900. In one or more embodiments, the storage device 906 is non-volatile, solid-state memory. In other embodiments, the storage device 906 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 908 allows a user to provide input to, receive output from, and otherwise transfer data to and receive data from computing device 900. The I/O interface 908 may include a mouse, a keypad or a keyboard, a touch screen, a camera, an optical scanner, network interface, modem, other known I/O devices or a combination of such I/O interfaces. The I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user. The graphical data may be representative of one or more graphical user interfaces and/or any other graphical content as may serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example and not by way of limitation, the communication interface 910 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 910 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 910 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 910 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 912 may include hardware, software, or both that couples components of the computing device 900 to each other. As an example and not by way of limitation, the communication infrastructure 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the personalized reaction system 102 can be implemented by a networking system 104. In one or more embodiments, the networking system comprises a social networking system. In addition to the description given above, a social networking system may enable its users (such as persons or organizations) to interact with the system and with each other. The social networking system may, with input from a user, create and store in the social networking system a user profile associated with the user. The user profile may include demographic information, communication-channel information, and information on personal interests of the user. The social networking system may also, with input from a user, create and store a record of relationships of the user with other users of the social networking system, as well as provide services (e.g., posts, photo-sharing, event organization, messaging, games, or advertisements) to facilitate social interaction between or among users.

The social networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social networking system. A user may be an individual (human user), an entity (e.g., an enterprise, business, or third party application), or a group (e.g., of individuals or entities). A user node corresponding to a user may comprise information provided by the user and information gathered by various systems, including the social networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social networking system may construct a web page (or a structured document) of a concept node (e.g., a restaurant, a celebrity), incorporating one or more selectable option or selectable elements (e.g., "like", "check in") in the web page. A user can access the page using a web browser hosted by the user's client device and select a selectable option or selectable element, causing the client device to transmit to the social networking system a request to create an edge between a user node of the user and a concept node of the concept, indicating a relationship between the user and the concept (e.g., the user checks in a restaurant, or the user "likes" a celebrity).

As an example, a user may provide (or change) his or her city of residence, causing the social networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social networking system may support a variety of applications, such as photo sharing, on-line calendars and events, gaming, instant messaging, and advertising. For example, the social networking system may also include media sharing capabilities. Also, the social networking system may allow users to post photographs and other multimedia content items to a user's profile page (typically known as "wall posts" or "timeline posts") or in a photo album, both of which may be accessible to other users of the social networking system depending upon the user's configured privacy settings. The social networking system may also allow users to configure events. For example, a first user may configure an event with attributes including time and date of the event, location of the event and other users invited to the event. The invited users may receive invitations to the event and respond (such as by accepting the invitation or declining it). Furthermore, the social networking system may allow users to maintain a personal calendar. Similarly to events, the calendar entries may include times, dates, locations and identities of other users.

Figure 10:
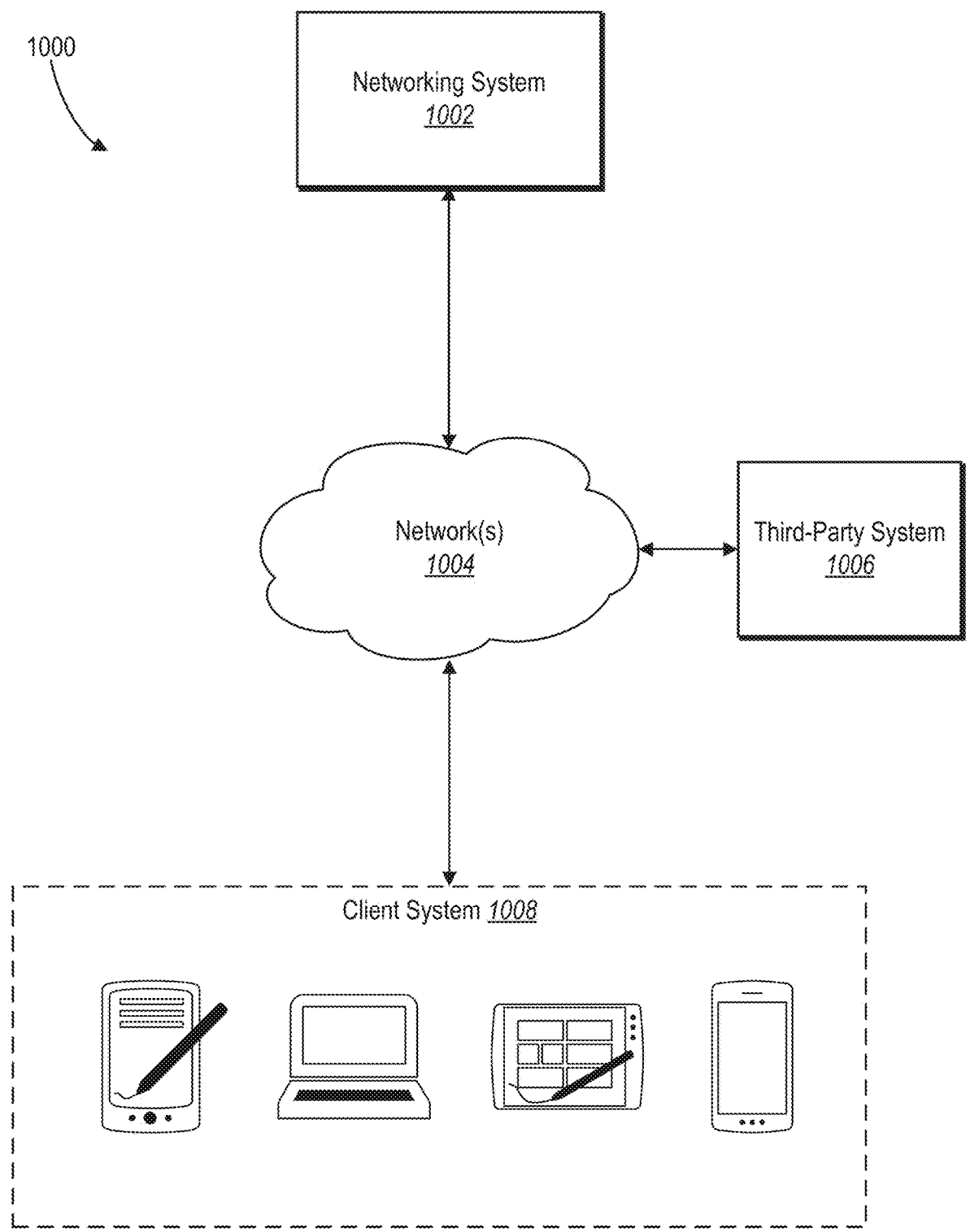
FIG. 10 is an example network environment of a networking system in accordance with one or more embodiments.

FIG. 10 illustrates an example network environment 1000 of a social networking system. Network environment 1000 includes a client system 1008, a networking system 1002 (e.g., a social networking system and/or an electronic messaging system), and a third-party system 1006 connected to each other by a network 1004. Although FIG. 10 illustrates a particular arrangement of the client system 1008, networking system 1002, third-party system 1006, and network 1004, this disclosure contemplates any suitable arrangement of the client system 1008, networking system 1002, third-party system 1006, and network 1004. As an example and not by way of limitation, two or more of client system 1008, networking system 1002, and third-party system 1006 may be connected to each other directly, bypassing network 1004. As another example, two or more of the client system 1008, networking system 1002, and third-party system 1006 may be physically or logically co-located with each other in whole or in part. Moreover, although FIG. 10 illustrates a particular number of client systems 1008, networking systems 1002, third-party systems 1006, and networks 1004, this disclosure contemplates any suitable number of client systems 1008, networking systems 1002, third-party systems 1006, and networks 1004. As an example and not by way of limitation, network environment 1000 may include multiple client systems 1008, networking systems 1002, third-party systems 1006, and networks 1004.

This disclosure contemplates any suitable network 1004. As an example and not by way of limitation, one or more portions of network 1004 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1004 may include one or more networks 1004.

Links may connect the client system 1008, networking system 1002, and third-party system 1006 to communication network 1004 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1000. One or more first links may differ in one or more respects from one or more second links.

In particular embodiments, the client system 908 may be an electronic device including hardware, software, or embedded logic components or a combination of two or more such components and capable of carrying out the appropriate functionalities implemented or supported by the client system 1008. As an example and not by way of limitation, a client system 1008 may include a computer system such as an augmented reality display device, a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 1008. A client system 1008 may enable a network user at the client system 1008 to access network 1004. A client system 1008 may enable its user to communicate with other users at other client devices 1008.

In particular embodiments, the client system 1008 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client system 1008 may enter a Uniform Resource Locator (URL) or other address directing the web browser to a particular server (such as server, or a server associated with a third-party system 1006), and the web browser may generate a Hyper Text Transfer Protocol (HTTP) request and communicate the HTTP request to server. The server may accept the HTTP request and communicate to the client system 1008 one or more Hyper Text Markup Language (HTML) files responsive to the HTTP request. The client system 1008 may render a webpage based on the HTML files from the server for presentation to the user. This disclosure contemplates any suitable webpage files. As an example, and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, networking system 1002 may be a network-addressable computing system that can host an online social network. Networking system 1002 may generate, store, receive, and send social-networking data, such as, for example, user-profile data, concept-profile data, social-graph information, or other suitable data related to the online social network. Networking system 1002 may be accessed by the other components of network environment 1000 either directly or via network 1004. In particular embodiments, networking system 1002 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, networking system 1002 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 1008, a networking system 1002, or a third-party system 1006 to manage, retrieve, modify, add, or delete, the information stored in data store.

In particular embodiments, networking system 1002 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Networking system 1002 may provide users of the online social network the ability to communicate and interact with other users. In particular embodiments, users may join the online social network via networking system 1002 and then add connections (e.g., relationships) to a number of other users of networking system 1002 that they want to be connected to. Herein, the term "friend" may refer to any other user of networking system 1002 with whom a user has formed a connection, association, or relationship via networking system 1002.

In particular embodiments, networking system 1002 may provide users with the ability to take actions on various types of items or objects, supported by networking system 1002. As an example and not by way of limitation, the items and objects may include groups or social networks to which users of networking system 1002 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in networking system 1002 or by an external system of third-party system 1006, which is separate from networking system 1002 and coupled to networking system 1002 via a network 1004.

In particular embodiments, networking system 1002 may be capable of linking a variety of entities. As an example and not by way of limitation, networking system 1002 may enable users to interact with each other as well as receive content from third-party systems 1006 or other entities, or to allow users to interact with these entities through an application programming interfaces (API) or other communication channels.

In particular embodiments, a third-party system 1006 may include one or more types of servers, one or more data stores, one or more interfaces, including but not limited to APIs, one or more web services, one or more content sources, one or more networks, or any other suitable components, e.g., that servers may communicate with. A third-party system 1006 may be operated by a different entity from an entity operating networking system 1002. In particular embodiments, however, networking system 1002 and third-party systems 1006 may operate in conjunction with each other to provide social-networking services to users of networking system 1002 or third-party systems 1006. In this sense, networking system 1002 may provide a platform, or backbone, which other systems, such as third-party systems 1006, may use to provide social-networking services and functionality to users across the Internet.

In particular embodiments, a third-party system 1006 may include a third-party content object provider. A third-party content object provider may include one or more sources of content objects, which may be communicated to a client system 1008. As an example, and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, networking system 1002 also includes user-generated content objects, which may enhance a user's interactions with networking system 1002. User-generated content may include anything a user can add, upload, send, or "post" to networking system 1002. As an example and not by way of limitation, a user communicates posts to networking system 1002 from a client system 1008. Posts may include data such as status updates or other textual data, location information, photos, videos, links, music or other similar data or media. Content may also be added to networking system 1002 by a third-party through a "communication channel," such as a newsfeed or stream.

In particular embodiments, networking system 1002 may include a variety of servers, sub-systems, programs, modules, logs, and data stores. In particular embodiments, networking system 1002 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Networking system 1002 may also include suitable components such as network interfaces, security mechanisms, load balancers, failover servers, management-and-network-operations consoles, other suitable components, or any suitable combination thereof. In particular embodiments, networking system 1002 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking networking system 1002 to one or more client system 1008 or one or more third-party system 1006 via network 1004. The web server may include a mail server or other messaging functionality for receiving and routing messages between networking system 1002 and one or more client systems 1008. An API-request server may allow a third-party system 1006 to access information from networking system 1002 by calling one or more APIs. An action logger may be used to receive communications from a web server about a user's actions on or off networking system 1002. In conjunction with the action log, a third-party-content-object log may be maintained of user exposures to third-party-content objects. A notification controller may provide information regarding content objects to a client system 1008. Information may be pushed to a client system 1008 as notifications, or information may be pulled from client system 1008 responsive to a request received from client system 1008. Authorization servers may be used to enforce one or more privacy settings of the users of networking system 1002. A privacy setting of a user determines how particular information associated with a user can be shared. The authorization server may allow users to opt in to or opt out of having their actions logged by networking system 1002 or shared with other systems (e.g., third-party system 1006), such as, for example, by setting appropriate privacy settings. Third-party-content-object stores may be used to store content objects received from third parties, such as a third-party system 1006. Location stores may be used for storing location information received from client system 1008 associated with users. Advertisement-pricing modules may combine social information, the current time, location information, or other suitable information to provide relevant advertisements, in the form of notifications, to a user.

Figure 11:
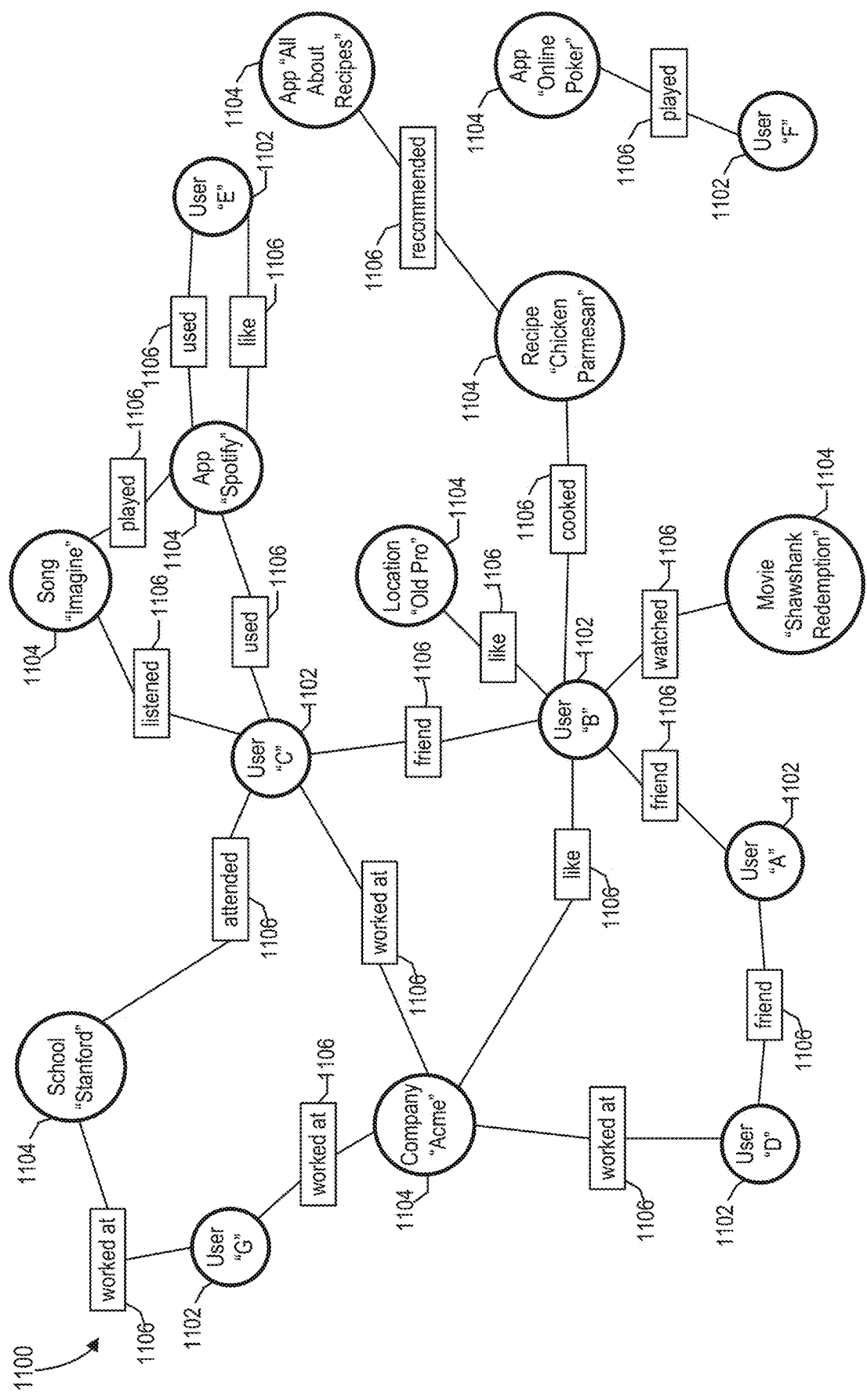
FIG. 11 illustrates a social graph in accordance with one or more embodiments.

FIG. 11 illustrates example social graph 1100. In particular embodiments, networking system 1002 may store one or more social graphs 1100 in one or more data stores. In particular embodiments, social graph 1100 may include multiple nodes—which may include multiple user nodes 1102 or multiple concept nodes 1104—and multiple edges 1106 connecting the nodes. Example social graph 1100 illustrated in FIG. 11 is shown, for didactic purposes, in a two-dimensional visual map representation. In particular embodiments, a networking system 1002, client system 1008, or third-party system 1006 may access social graph 1100 and related social-graph information for suitable applications. The nodes and edges of social graph 1100 may be stored as data objects, for example, in a data store (such as a social-graph database). Such a data store may include one or more searchable or query able indexes of nodes or edges of social graph 1100.

In particular embodiments, a user node 1102 may correspond to a user of networking system 1002. As an example and not by way of limitation, a user may be an individual (human user), an entity (e.g., an enterprise, business, or third-party application), or a group (e.g., of individuals or entities) that interacts or communicates with or over networking system 1002. In particular embodiments, when a user registers for an account with networking system 1002, networking system 1002 may create a user node 1102 corresponding to the user, and store the user node 1102 in one or more data stores. Users and user nodes 1102 described herein may, where appropriate, refer to registered users and user nodes 1102 associated with registered users. In addition or as an alternative, users and user nodes 1102 described herein may, where appropriate, refer to users that have not registered with networking system 1002. In particular embodiments, a user node 1102 may be associated with information provided by a user or information gathered by various systems, including networking system 1002. As an example and not by way of limitation, a user may provide his or her name, profile picture, contact information, birth date, sex, marital status, family status, employment, education background, preferences, interests, or other demographic information. In particular embodiments, a user node 1102 may be associated with one or more data objects corresponding to information associated with a user. In particular embodiments, a user node 1102 may correspond to one or more webpages.

In particular embodiments, a concept node 1104 may correspond to a concept. As an example and not by way of limitation, a concept may correspond to a place (such as, for example, a movie theater, restaurant, landmark, or city); a website (such as, for example, a website associated with networking system 1002 or a third-party website associated with a web-application server); an entity (such as, for example, a person, business, group, sports team, or celebrity); a resource (such as, for example, an audio file, video file, digital photo, text file, structured document, or application) which may be located within networking system 1002 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1104 may be associated with information of a concept provided by a user or information gathered by various systems, including networking system 902. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1104 may be associated with one or more data objects corresponding to information associated with concept node 1104. In particular embodiments, a concept node 1104 may correspond to one or more webpages.

In particular embodiments, a node in social graph 1100 may represent or be represented by a webpage (which may be referred to as a "profile page"). Profile pages may be hosted by or accessible to networking system 902. Profile pages may also be hosted on third-party websites associated with a third-party system 808. As an example and not by way of limitation, a profile page corresponding to a particular external webpage may be the particular external webpage and the profile page may correspond to a particular concept node 1104. Profile pages may be viewable by all or a selected subset of other users. As an example and not by way of limitation, a user node 1102 may have a corresponding user-profile page in which the corresponding user may add content, make declarations, or otherwise express himself or herself. As another example and not by way of limitation, a concept node 1104 may have a corresponding concept-profile page in which one or more users may add content, make declarations, or express themselves, particularly in relation to the concept corresponding to concept node 1104.

In particular embodiments, a concept node 1104 may represent a third-party webpage or resource hosted by a third-party system 1006. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 908 to send to networking system 902 a message indicating the user's action. In response to the message, networking system 902 may create an edge (e.g., an "eat" edge) between a user node 1102 corresponding to the user and a concept node 1104 corresponding to the third-party webpage or resource and store edge 1106 in one or more data stores.

In particular embodiments, a pair of nodes in social graph 1100 may be connected to each other by one or more edges 1106. An edge 1106 connecting a pair of nodes may represent a relationship between the pair of nodes. In particular embodiments, an edge 1106 may include or represent one or more data objects or attributes corresponding to the relationship between a pair of nodes. As an example and not by way of limitation, a first user may indicate that a second user is a "friend" of the first user. In response to this indication, networking system 1002 may send a "friend request" to the second user. If the second user confirms the "friend request," networking system 1002 may create an edge 1106 connecting the first user's user node 1102 to the second user's user node 1102 in social graph 1100 and store edge 1106 as social-graph information in one or more of data stores. In the example of FIG. 11, social graph 1100 includes an edge 1106 indicating a friend relation between user nodes 1102 of user "A" and user "B" and an edge indicating a friend relation between user nodes 1102 of user "C" and user "B." Although this disclosure describes or illustrates particular edges 1106 with particular attributes connecting particular user nodes 1102, this disclosure contemplates any suitable edges 1106 with any suitable attributes connecting user nodes 1102. As an example and not by way of limitation, an edge 1106 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1100 by one or more edges 1106.

In particular embodiments, an edge 1106 between a user node 1102 and a concept node 1104 may represent a particular action or activity performed by a user associated with user node 1102 toward a concept associated with a concept node 1104. As an example and not by way of limitation, as illustrated in FIG. 11, a user may "like," "attended," "played," "listened," "cooked," "worked at," or "watched" a concept, each of which may correspond to an edge type or subtype. A concept-profile page corresponding to a concept node 1104 may include, for example, a selectable "check in" icon (such as, for example, a clickable "check in" icon) or a selectable "add to favorites" icon. Similarly, after a user clicks these icons, networking system 1002 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, networking system 1002 may create a "listened" edge 1106 and a "used" edge (as illustrated in FIG. 11) between user nodes 1102 corresponding to the user and concept nodes 1104 corresponding to the song and application to indicate that the user listened to the song and used the application. Moreover, networking system 1002 may create a "played" edge 1106 (as illustrated in FIG. 11) between concept nodes 1104 corresponding to the song and the application to indicate that the particular song was played by the particular application. In this case, "played" edge 1106 corresponds to an action performed by an external application (SPOTIFY) on an external audio file (the song "Imagine"). Although this disclosure describes particular edges 1106 with particular attributes connecting user nodes 1102 and concept nodes 1104, this disclosure contemplates any suitable edges 1106 with any suitable attributes connecting user nodes 1102 and concept nodes 1104. Moreover, although this disclosure describes edges between a user node 1102 and a concept node 1104 representing a single relationship, this disclosure contemplates edges between a user node 1102 and a concept node 1104 representing one or more relationships. As an example and not by way of limitation, an edge 1106 may represent both that a user likes and has used at a particular concept. Alternatively, another edge 1106 may represent each type of relationship (or multiples of a single relationship) between a user node 1102 and a concept node 1104 (as illustrated in FIG. 11 between user node 1102 for user "E" and concept node 1104 for "SPOTIFY").

In particular embodiments, networking system 1002 may create an edge 1106 between a user node 1102 and a concept node 1104 in social graph 1100. As an example and not by way of limitation, a user viewing a concept-profile page (such as, for example, by using a web browser or a special-purpose application hosted by the user's client system 1008) may indicate that he or she likes the concept represented by the concept node 1104 by clicking or selecting a "Like" icon, which may cause the user's client system 1008 to send to networking system 1002 a message indicating the user's liking of the concept associated with the concept-profile page. In response to the message, networking system 1002 may create an edge 1106 between user node 1102 associated with the user and concept node 1104, as illustrated by "like" edge 1106 between the user and concept node 1104. In particular embodiments, networking system 1002 may store an edge 1106 in one or more data stores. In particular embodiments, an edge 1106 may be automatically formed by networking system 1002 in response to a particular user action. As an example and not by way of limitation, if a first user uploads a picture, watches a movie, or listens to a song, an edge 1106 may be formed between user node 1102 corresponding to the first user and concept nodes 1104 corresponding to those concepts. Although this disclosure describes forming particular edges 1106 in particular manners, this disclosure contemplates forming any suitable edges 1106 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on networking system 1002). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, networking system 1002 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through networking system 1002) or RSVP (e.g., through networking system 1002) to an event associated with the advertisement. In addition or as an alternative, an advertisement may include social-networking-system context directed to the user. As an example and not by way of limitation, an advertisement may display information about a friend of the user within networking system 1002 who has taken an action associated with the subject matter of the advertisement.

In particular embodiments, networking system 1002 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 808 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, networking system 1002 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part based on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, networking system 1002 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the networking system 1002 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, networking system 1002 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, networking system 1002 may calculate a coefficient based on a user's actions. Networking system 1002 may monitor such actions on the online social network, on a third-party system 1006, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, networking system 1002 may calculate a coefficient based on the user's actions with particular types of content. The content may be associated with the online social network, a third-party system 808, or another suitable system. The content may include users, profile pages, posts, news stories, headlines, instant messages, chat room conversations, emails, advertisements, pictures, video, music, other suitable objects, or any combination thereof. Networking system 1002 may analyze a user's actions to determine whether one or more of the actions indicate an affinity for subject matter, content, other users, and so forth. As an example and not by way of limitation, if a user may make frequently posts content related to "coffee" or variants thereof, networking system 1002 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, networking system 1002 may calculate a coefficient based on the type of relationship between particular objects. Referencing the social graph 1100, networking system 1002 may analyze the number and/or type of edges 1106 connecting particular user nodes 1102 and concept nodes 1104 when calculating a coefficient. As an example and not by way of limitation, user nodes 1102 that are connected by a spouse-type edge (representing that the two users are married) may be assigned a higher coefficient than a user node 1102 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, networking system 1002 may determine that the user has a higher coefficient with respect to the first photo than the second photo because having a tagged-in-type relationship with content may be assigned a higher weight and/or rating than having a like-type relationship with content. In particular embodiments, networking system 1002 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, networking system 1002 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 1100. As an example and not by way of limitation, social-graph entities that are closer in the social graph 1100 (i.e., fewer degrees of separation) may have a higher coefficient than entities that are further apart in the social graph 1100.

In particular embodiments, networking system 1002 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 1008 of the user). A first user may be more interested in other users or concepts that are closer to the first user. As an example and not by way of limitation, if a user is one mile from an airport and two miles from a gas station, networking system 1002 may determine that the user has a higher coefficient for the airport than the gas station based on the proximity of the airport to the user.

In particular embodiments, networking system 1002 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, networking system 1002 may provide information that is relevant to user's interests and current circumstances, increasing the likelihood that they will find such information of interest. In particular embodiments, networking system 1002 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, networking system 1002 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, networking system 1002 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 808 (e.g., via an API or other communication channel), or from another suitable system. In response to the request, networking system 1002 may calculate the coefficient (or access the coefficient information if it has previously been calculated and stored). In particular embodiments, networking system 1002 may measure an affinity with respect to a particular process. Different processes (both internal and external to the online social network) may request a coefficient for a particular object or set of objects. Networking system 1002 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1104 corresponding to a particular photo may have a privacy setting specifying that the photo may only be accessed by users tagged in the photo and their friends. In particular embodiments, privacy settings may allow users to opt in or opt out of having their actions logged by networking system 1002 or shared with other systems (e.g., third-party system 808). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 808, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, networking system 1002 may send a request to the data store for the object. The request may identify the user associated with the request and may only be sent to the user (or a client system 1008 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A method for generating customized reaction elements to social media content, comprising:
   detecting, by a processor of a client-computing device, a selection of an option to create a personalized selfie reaction-element in connection with social media content;
   providing, from a camera of the client-computing device, a live camera viewfinder display via a graphical user interface;
   capturing, in response to a detected selection of a capture element, a multi-media item of a face of a user via the camera of the client-computing device;
   detecting a selection of one or more augmented reality enhancements, the one or more augmented reality enhancements comprising additional computer-generated elements relative to the face of the user in the multi-media item;
   generating the personalized selfie reaction-element by combining the multi-media item of the face of the user and the selected one or more augmented reality enhancements by overlaying the one or more augmented reality enhancements over the face of the user in the multi-media item; and
   providing the personalized selfie reaction-element for association with the social media content.

2. The method as recited in claim 1, further comprising generating an electronic communication comprising the personalized selfie reaction-element with the overlayed one or more augmented reality enhancements.

3. The method as recited in claim 2, wherein generating the personalized selfie reaction-element further comprises performing facial recognition for the face of the user to determine a location for overlaying the one or more augmented reality enhancements.

4. The method as recited in claim 2, wherein generating the personalized selfie reaction-element further comprises altering, based on the face within the multi-media item, an appearance of one or more portions of the multi-media item of the user based on the selected one or more augmented reality enhancements.

5. The method as recited in claim 1, wherein generating the personalized selfie reaction-element further comprises generating a multi-media recording of the user and automatically looping the multi-media recording of the user combined with the selected one or more augmented reality enhancements.

6. The method as recited in claim 1, further comprising:
   detecting a selection of a color-gradient option associated with the multi-media item of the user; and
   wherein generating the personalized selfie reaction-element further comprises:
      converting the multi-media item to black and white;
      cropping a background out of the multi-media item of the user; and
      adding a color-gradient background into the multi-media item of the user.

7. The method as recited in claim 1, further comprising:
   detecting a selection of a placement location associated with the social media content; and
   wherein providing the personalized selfie reaction-element for association with the social media content further comprises providing the placement location associated with the social media content.

8. A system comprising:
   at least one camera;
   at least one processor; and
   at least one non-transitory computer-readable storage medium storing instructions thereon that, when executed by the at least one processor, cause the system to:
      detect a selection of an option to create a personalized selfie reaction-element in connection with social media content;
      provide, from the at least one camera, a live camera viewfinder display via a graphical user interface;
      capture, in response to a detected selection of a capture element, a multi-media item of a face of a user via the at least one camera;
      detect a selection of one or more augmented reality enhancements, the one or more augmented reality enhancements comprising additional computer-generated elements relative to the face of the user in the multi-media item;
      generate the personalized selfie reaction-element by combining the multi-media item of the face of the user and the selected one or more augmented reality enhancements by overlaying the one or more augmented reality enhancements over the face of the user in the multi-media item; and provide the personalized selfie reaction-element for association with the social media content.

9. The system as recited in claim 8, further storing instructions thereon that, when executed by the at least one processor, cause the system to generate an electronic communication comprising the personalized selfie reaction-element with the overlayed one or more augmented reality enhancements.

10. The system as recited in claim 9, further storing instructions thereon that, when executed by the at least one processor, cause the system to perform facial recognition for the face of the user to determine a location for overlaying the one or more augmented reality enhancements.

11. The system as recited in claim 9, further storing instructions thereon that, when executed by the at least one processor, cause the system to generate the personalized selfie reaction-element by altering, based on the face within the multi-media item, an appearance of one or more portions of the multi-media item of the user based on the selected one or more augmented reality enhancements.

12. The system as recited in claim 8, further storing instructions thereon that, when executed by the at least one processor, cause the system to generate the personalized selfie reaction-element by generating a multi-media item of the user and automatically looping the multi-media item of the user combined with the selected one or more augmented reality enhancements.

13. The system as recited in claim 8, further storing instructions thereon that, when executed by the at least one processor, cause the system to:
   detect a selection of a color-gradient option associated with the multi-media item of the user; and
   generate the personalized selfie reaction-element by:
      converting the multi-media item to black and white;
      cropping a background out of the multi-media item of the user; and
      adding a color-gradient background into the multi-media item of the user.

14. The system as recited in claim 8, further storing instructions thereon that, when executed by the at least one processor, cause the system to:
   detect a selection of a placement location associated with the social media content; and
   wherein providing the personalized selfie reaction-element for association with the social media content further comprises providing the placement location associated with the social media content.

15. A non-transitory computer-readable medium storing instructions thereon that, when executed by at least one processor, cause a client-computing device to:
   detect a selection of an option to create a personalized selfie reaction-element in connection with social media content;
   provide, from a camera of the client-computing device, a live camera viewfinder display via a graphical user interface;
   capture, in response to a detected selection of a capture element, a multi-media item of a face of a user via the camera of the client-computing device;
   detect a selection of one or more augmented reality enhancements, the one or more augmented reality enhancements comprising additional computer-generated elements relative to the face of the user in the multi-media item;
   generate the personalized selfie reaction-element by combining the multi-media item of the face of the user and the selected one or more augmented reality enhancements by overlaying the one or more augmented reality enhancements over the face of the user in the multi-media item; and
   providing the personalized selfie reaction-element for association with the social media content.

16. The non-transitory computer-readable medium as recited in claim 15, further storing instructions thereon that, when executed by the at least one processor, cause the client-computing device to generate an electronic communication comprising the personalized selfie reaction-element with the overlayed one or more augmented reality enhancements.

17. The non-transitory computer-readable medium as recited in claim 15, wherein the instructions thereon that, when executed by the at least one processor, cause the client-computing device to perform facial recognition for the face of the user to determine a location for overlaying the one or more augmented reality enhancements.

18. The non-transitory computer-readable medium as recited in claim 15, wherein the instructions thereon that, when executed by the at least one processor, cause the client-computing device to generate the personalized selfie reaction-element by altering, based on the face within the multi-media item, an appearance of one or more portions of the multi-media item of the user based on the selected one or more augmented reality enhancements.

19. The non-transitory computer-readable medium as recited in claim 15, further storing instructions thereon that, when executed by the at least one processor, cause the client-computing device to:
   detect a selection of a color-gradient option associated with the multi-media item of the user; and
   generate the personalized selfie reaction-element by:
      converting the multi-media item to black and white;
      cropping a background out of the multi-media item of the user; and
      adding a color-gradient background into the multi-media item of the user.

20. The non-transitory computer-readable medium as recited in claim 15, further storing instructions thereon that, when executed by the at least one processor, cause the client-computing device to:
   detect a selection of a placement location associated with the social media content; and
   wherein providing the personalized selfie reaction-element for association with the social media content further comprises providing the placement location associated with the social media content.

* * * * *